US012743418B2

(12) United States Patent
Panyam Chandrasekarasatry et al.

(10) Patent No.: US 12,743,418 B2
(45) Date of Patent: Sep. 22, 2026

(54) IN-CONTEXT LEARNING FOR NL2SQL WITH PATTERN BASED RETRIEVAL

(71) Applicant: Oracle International Corporation, Redwood Shores, CA (US)

(72) Inventors: Nagesh Panyam Chandrasekarasatry, Melbourne (AU); Duy Vu, Melbourne (AU); Dai Quoc Nguyen, Raceview (AU); Gioacchino Tangari, Sydney (AU); Cong Duy Vu Hoang, Wantirna South (AU); Yakupitiyage Don Thanuja Samodhye Dharmasiri, Melbourne (AU); Vladislav Blinov, Melbourne (AU); Thanh Tien Vu, Herston (AU); Ying Xu, Melbourne (AU); Thanh Long Duong, Melbourne (AU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 19/062,932

(22) Filed: Feb. 25, 2025

(65) Prior Publication Data

US 2026/0072909 A1 Mar. 12, 2026

Related U.S. Application Data

(60) Provisional application No. 63/691,406, filed on Sep. 6, 2024.

(51) Int. Cl.
*G06F 16/2452* (2019.01)
*G06F 16/2457* (2019.01)

(52) U.S. Cl.
CPC .. *G06F 16/24522* (2019.01); *G06F 16/24578* (2019.01)

(58) Field of Classification Search
None
See application file for complete search history.

(56) References Cited

U.S. PATENT DOCUMENTS

| | | | | |
|---|---|---|---|---|
| 12,118,325 B2 | 10/2024 | Gray et al. | | |
| 2023/0186025 A1* | 6/2023 | John | ..................... | G06F 16/243 704/9 |

(Continued)

FOREIGN PATENT DOCUMENTS

WO WO-2025260087 A1 * 12/2025

OTHER PUBLICATIONS

Salem, Omar, "Advancing Natural Language to SQL Translation: Integrating Few-Shot Learning, Large Language Models, and Clustering Techniques", Master's Thesis, Eindhoven University of Technology, Jan. 2024, 53 pages. (Year: 2024).*

(Continued)

*Primary Examiner* — Scott A. Waldron
(74) *Attorney, Agent, or Firm* — Kilpatrick Townsend & Stockton LLP

(57) ABSTRACT

The present disclosure relates to machine learning techniques for In-Context-Learning (ICL) with pattern-based retrieval for the task of converting Natural Language (NL) to Structured Query Language (SQL). Aspects are directed towards acquiring a natural language utterance and a database schema, searching, using at least a portion of the natural language utterance as a key, a memory bank for one or more in-context examples that are relevant to the key, generating a prompt comprising the natural language query, the database schema, and the one or more in-context examples, transmitting the prompt to a first pretrained generative artificial intelligence model, receiving, from the first pretrained generative artificial intelligence model, a logical form corresponding to the natural language utterance based at least in part on the prompt, executing the logical form on (Continued)

a database to obtain a query result, and providing the query result to a user.

18 Claims, 11 Drawing Sheets

(56) References Cited

U.S. PATENT DOCUMENTS

| | | | | |
|---|---|---|---|---|
| 2024/0362212 | A1* | 10/2024 | Sun | G06F 16/24522 |
| 2025/0045508 | A1* | 2/2025 | Petruk | G06Q 10/10 |
| 2025/0238614 | A1* | 7/2025 | Panda | G06F 40/295 |

OTHER PUBLICATIONS

Feng, Yuxi, et al., "DeTriever: Decoder-representation-based Retriever for Improving NL2SQL In-Context Learning", arXiv, submitted on Jun. 12, 2024, available at: https://arxiv.org/abs/2406.07913v1, 11 pages. (Year: 2024).*

* cited by examiner

IN-CONTEXT LEARNING FOR NL2SQL WITH PATTERN BASED RETRIEVAL

CROSS-REFERENCE TO RELATED APPLICATION

The present application is a non-provisional application of and claims the benefit and priority under 35 U.S.C. 119 (c) of U.S. Provisional Application No. 63/691,406, filed Sep. 6, 2024, the entire contents of which is incorporated herein by reference for all purposes.

FIELD

The present disclosure relates generally to converting natural language to a logical form, and more particularly, to machine learning techniques for In-Context-Learning (ICL) with pattern-based retrieval for the task of converting Natural Language (NL) to Structured Query Language (SQL).

BACKGROUND

The advent of database management systems has revolutionized the way large datasets are stored, managed, and queried. Traditional databases, such as relational databases, have become the backbone of many applications across various industries. These databases are structured to store data in tables, allowing for the organization and retrieval of information in a systematic manner. The efficiency and reliability of databases have made them indispensable in fields such as finance, healthcare, and e-commerce, where large volumes of data need to be managed with precision and speed.

Structured Query Language (SQL) has been the primary tool for interacting with relational databases. SQL allows users to perform a wide range of operations, including data insertion, updates, deletions, and complex queries to retrieve specific information. The power and flexibility of SQL have made it the standard language for database management. However, the effective use of SQL requires a certain level of expertise, as constructing accurate and efficient queries can be complex and challenging for users who are not well-versed in the language.

In recent years, there has been a significant development in the field of databases with the emergence of text-to-SQL systems. These systems are designed to bridge the gap between natural language and SQL, enabling users to interact with databases using plain, conversational language. Text-to-SQL systems leverage advanced natural language processing (NLP) techniques and machine learning algorithms to translate user queries expressed in natural language into SQL commands. This innovation has the potential to democratize access to databases, allowing users without specialized SQL knowledge to efficiently retrieve and manipulate data.

The integration of text-to-SQL systems into database management represents a significant advancement in making databases more accessible and user-friendly. By simplifying the interaction with databases, these systems can enhance productivity and reduce the learning curve associated with database management. As businesses and organizations continue to accumulate and rely on large datasets, the ability to easily and accurately query databases using natural language will become increasingly valuable. This disclosure presents techniques related to the implementation and improvement of text-to-query language technologies including SQL, ensuring that the benefits of these advancements can be realized across various domains.

BRIEF SUMMARY

Machine learning techniques are disclosed herein (e.g., a computer-implemented method, a system, non-transitory computer-readable medium storing code or instructions executable by one or more processors) for ICL with pattern-based retrieval for the task of converting NL to SQL, enabling the improvement of large language models' (LLMs) SQL generation and database query efficiency and accuracy.

In various embodiments, a computer-implemented method is provided for that includes acquiring a natural language utterance and a database schema; searching, using at least a portion of the natural language utterance as a key, a memory bank for one or more in-context examples that are relevant to the key, wherein the memory bank comprises in-context examples, and each of the in-context examples comprises an illustrative natural language utterance, an illustrative logical form corresponding to the illustrative natural language utterance, and an illustrative database schema; generating a prompt comprising the natural language query, the database schema, and the one or more in-context examples; transmitting the prompt to a first pretrained generative artificial intelligence model; receiving, from the first pretrained generative artificial intelligence model, a logical form corresponding to the natural language utterance based at least in part on the prompt; executing the logical form on a database to obtain a query result; and providing the query result to a user.

In some embodiments, the computer-implemented method further includes receiving positive feedback from the user concerning the query result; and responsive to receiving the positive feedback, storing the natural language utterance, the database schema, and the logical form corresponding to the natural language utterance as an additional in-context example within the memory bank.

In various embodiments, the computer-implemented method further includes prior to the searching, transmitting the natural language utterance to a second pretrained generative artificial intelligence model; receiving, from the second pretrained generative artificial intelligence model, a natural language text pattern based at least in part on the natural language utterance, wherein: the natural language text pattern comprises a portion of the natural language utterance, each of the in-context examples comprises an illustrative natural language utterance, an illustrative natural language text pattern corresponding to the illustrative natural language utterance, an illustrative logical form corresponding to the illustrative natural language utterance, and an illustrative database schema, the memory bank is searched for the one or more in-context examples that are relevant to the key using the natural language text pattern as the key, and the searching comprises: determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

In some embodiments, each of the in-context examples comprises an illustrative natural language utterance, an illustrative natural language text pattern corresponding to the illustrative natural language utterance, an illustrative logical form corresponding to the illustrative natural language utterance, and an illustrative database schema, and the searching comprises: determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

In some embodiments, the searching comprises: determining a similarity score as a metric of similarity between the key and the illustrative natural language utterance corresponding to each of the in-context examples, comparing the similarity scores to a predetermined threshold, and identifying one or more in-context examples having a similarity score greater than or equal to the predetermined threshold as the one or more in-context examples that are relevant to the key.

In some embodiments, the computer-implemented method further includes: comparing the database schema to the illustrative database schemas of the in-context examples; determining, based on the comparing, the database schema is not the same as any of the illustrative database schemas; responsive to determining the database schema is not the same as any of the illustrative database schemas, transmitting the natural language utterance to a second pretrained generative artificial intelligence model; and receiving, from the second pretrained generative artificial intelligence model, a natural language text pattern based at least in part on the natural language utterance, wherein: the natural language text pattern comprises a portion of the natural language utterance, each of the in-context examples comprises an illustrative natural language utterance, an illustrative natural language text pattern corresponding to the illustrative natural language utterance, an illustrative logical form corresponding to the illustrative natural language utterance, and an illustrative database schema, the memory bank is searched for the one or more in-context examples that are relevant to the key using the natural language text pattern as the key, and the searching comprises: determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

In various embodiments, the computer-implemented method further includes: comparing the database schema to the illustrative database schemas of the in-context examples; and determining, based on the comparing, the database schema is the same as one or more of the illustrative database schemas, wherein: responsive to determining the database schema is the same as one or more of the illustrative database schemas, the memory bank is searched for the one or more in-context examples that have an illustrative database schema that is the same as the database schema and are relevant to the key using the natural language text pattern as the key, and the searching comprises: determining a similarity score as a metric of similarity between the key and the illustrative natural language utterance corresponding to each of the in-context examples, comparing the similarity scores to a predetermined threshold, and identifying one or more in-context examples having a similarity score greater than or equal to the predetermined threshold as the one or more in-context examples that are relevant to the key.

In some embodiments, a system is provided that includes one or more processors and one or more computer-readable media storing instructions which, when executed by the one or more processors, cause the system to perform part or all of the operations and/or methods disclosed herein.

In some embodiments, one or more non-transitory computer-readable media are provided for storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

The present disclosure will be better understood in view of the following non-limiting figures, in which.

DETAILED DESCRIPTION

Figure 1:
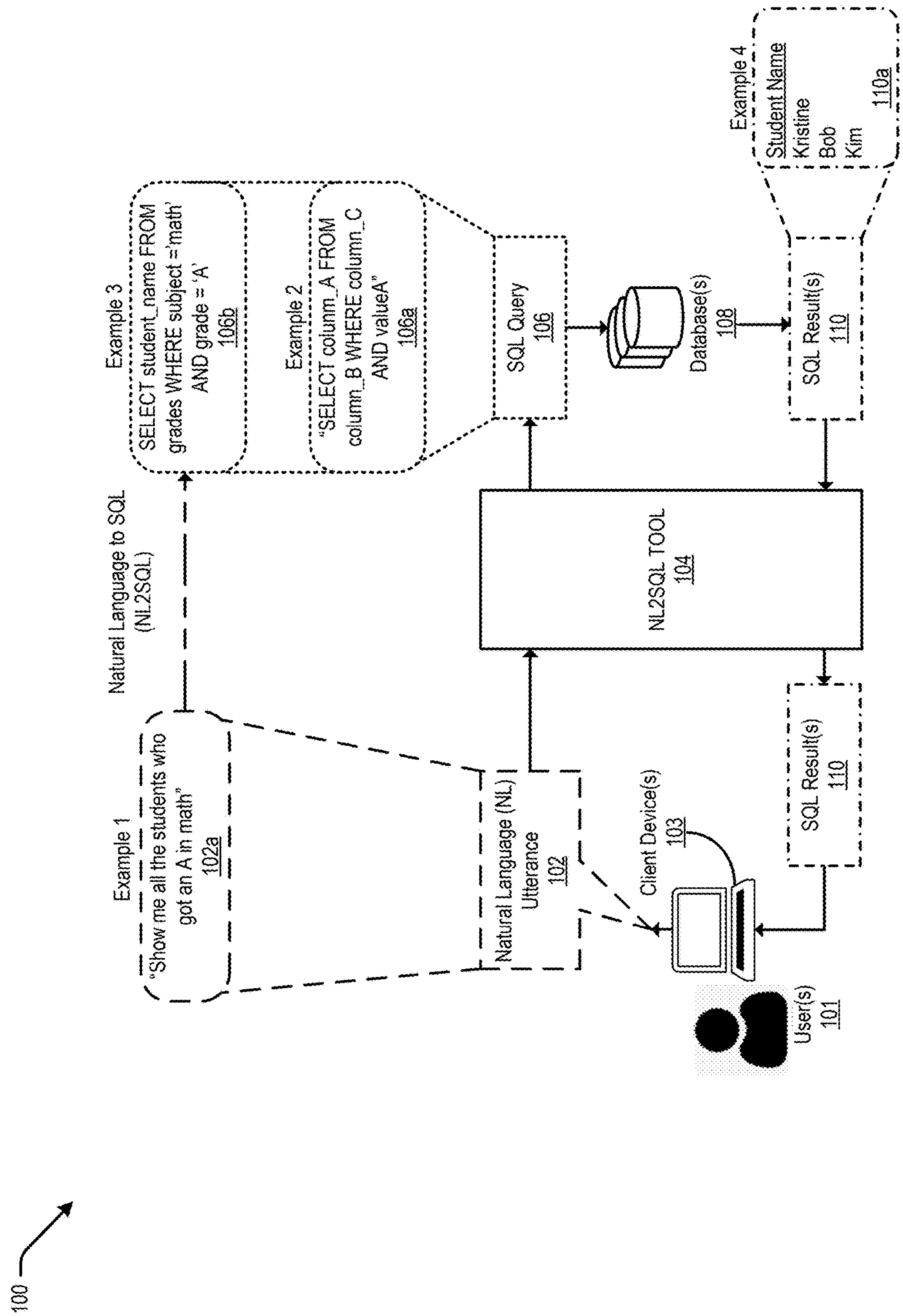
FIG. 1 depicts a simplified diagram for an example NL2SQL tool, according to various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

In recent years, the amount of data powering different industries and their systems has been increasing exponentially. A majority of business information is stored in the form of relational databases that store, process, and retrieve data. Databases power information systems across multiple industries, for instance, consumer tech (e.g., orders, cancellations, refunds), supply chain (e.g., raw materials, stocks, vendors), healthcare (e.g., medical records), finance (e.g., financial business metrics), customer support, search engines, and much more. It is imperative for modern data-driven companies to track the real-time state of its business in order to quickly understand and diagnose any emerging issues, trends, or anomalies in the data and take immediate corrective actions. This work is usually performed manually by analysts who compose complex queries in query languages (e.g., database query languages such as declarative query languages) like SQL, PGQL, logical database queries, API query languages such as GraphQL, REST, and so forth. Composing such queries can be used to derive insightful information from data stored in multiple tables. These results are typically processed in the form of charts or graphs to enable users to quickly visualize the results and facilitate data-driven decision making.

Although common database queries (e.g., SQL queries) are often predefined and incorporated in commercial products, any new or follow-up queries still need to be manually coded by the analysts. Such static interactions between database queries and consumption of the corresponding results require time-consuming manual intervention and result in slow feedback cycles. It is vastly more efficient to have non-technical users (e.g., business leaders, doctors, or other users of the data) directly interact with the analytics tables via natural language (NL) queries that abstract away the underlying query language (e.g., SQL) code. Defining the database query requires a strong understanding of database schema and query language syntax and can quickly get overwhelming for beginners and non-technical stakeholders. Efforts to bridge this communication gap have led to the development of a new type of processing called natural language interfaces for databases (NLIDB). This natural search capability has become more popular over recent years as companies are developing deep-learning approaches for natural language to logical form (NL2LF) translation such as natural language to SQL (NL2SQL).

Logical form as used herein refers to (i) programming query languages, (ii) intermediate forms, and/or (iii) programming languages. Programming query languages can include database query languages, and examples of programming query languages include, but are not limited to, SQL, PQL, GraphQL, SPARQL, and the like. Intermediate forms can refer to machine-oriented languages and/or meaning representation languages (MRLs) such as OMRL, AMRL, and the like. Examples of programming languages include, but are not limited to, Python, C++, Java, Ruby, and the like. NL2SQL seeks to transform or translate natural language questions to SQL, allowing individuals to run unstructured queries against databases. The converted SQL could also enable digital assistants such as chatbots and others to improve their responses when the answer can be found in different databases or tables with different schemas.

In some instances, NL2SQL transforms natural language to SQL using generative artificial intelligence models such as large language models (LLMs). An LLM is a type of artificial intelligence (AI) that is trained to understand, generate, and manipulate human language (e.g., text data) in a coherent and contextually relevant manner. LLMs have resulted in significant progress in natural language processing tasks such as text-to-code (e.g., text-to-SQL), text generation and translation, and sentiment analysis. Due to their attention mechanisms and deep neural architectures, LLMs excel at capturing nuanced language patterns and correlations in massive volumes of text data. LLMs are designed to predict the next word or token in a sequence of text by computing a probability distribution over a fixed vocabulary for the next token based on the context of the preceding tokens. The prediction is achieved through a series of self-attention mechanisms incorporated in the LLMs that assign varying degrees of importance to different parts of the input sequence that enable the LLMs to make informed predictions. LLMs generate contextually appropriate and coherent text by learning a fixed vocabulary from enormous text corpora and predicting which token included in the fixed vocabulary should be the next token in an output sequence.

More specifically, given a Text-to-SQL implementation, the generative artificial intelligence model is tasked to convert NL queries into executable SQL statements that can be used to provide the answer to the natural language query. In this implementation the generative artificial intelligence model is also provided with a database or system that provides the context for answering the NL queries. For example, given a Sales-database and the NL query such as "What is the total advertising expenditure in 2024", the task of the generative artificial intelligence model is to automatically generate the SQL statement of the form "select sum (amount) from expenditure where year=2024 and expense type='advertising'". A pre-trained generative artificial intelligence model such as a pre-trained LLM, further fine-tuned on Text-to-SQL pairs is fed with a suitable prompt that contains the NL query to generate the desired SQL statement.

However, generative artificial intelligence models, while powerful, are not immune to generating inaccuracies in their responses. These inaccuracies often stem from limitations in understanding nuanced context, gaps in training data, or the probabilistic nature of their predictions, which may prioritize plausible-sounding language over factual accuracy. Additionally, generative artificial intelligence models may struggle with domain-specific knowledge, language intricacies, or evolving developments in a given domain if their training data is outdated or lacks the necessary depth. Conventionally, there has been several strategies for addressing the accuracy challenges, including fine-tuning for domain-specific knowledge, post-processing and verification, incorporating external knowledge bases, user feedback loops, prompt engineering, multi-model or ensemble approaches, human oversight and review, and regular model updates.

Addressing the accuracy challenges inherent in generative artificial intelligence models, through such means comes with its own set of difficulties. For instance, fine-tuning a model for domain-specific knowledge requires access to high-quality, curated datasets, which can be time-consuming and costly to compile, especially in specialized fields. Additionally, fine-tuned models may become overly specialized, potentially losing general applicability. Post-processing and verification, while effective, demands integration with additional tools or databases, which can involve complex technical implementation and increased resource allocation. Incorporating external knowledge bases requires ensuring the seamless integration of real-time data, but this approach is vulnerable to issues of latency, compatibility, and maintaining access to up-to-date information. User feedback loops rely on consistent and knowledgeable user input, which may not always be feasible or scalable, and they require robust mechanisms for processing feedback without introducing bias. Prompt engineering, though useful, involves trial and error and may not fully eliminate inaccuracies in complex or ambiguous scenarios. Multi-model or ensemble approaches increase system complexity and computational demands, making them more resource-intensive. Similarly, human oversight, while important for ensuring accuracy, can be labor-intensive and slow down workflows, potentially negating the efficiency benefits of using generative artificial intelligence models. Finally, regular model updates or retraining, while necessary to keep the model current, require significant computational resources and careful handling to avoid introducing new errors, regression, and biases. These challenges illustrate that while these methods can enhance the accuracy of generative artificial intelligence models, they often involve trade-offs in terms of cost, efficiency, and implementation complexity.

TABLE 1

| NL Question | Fetch payments from last April |
|---|---|
| SQL (expected) | select * from payments where extract(year from payment_date) > . . . |
| Test schema | Schema=Fusion: Create Table payments ( project_id integer, payment_date datetime, amount float,. ) |

TABLE 2

| Candidate Id | NL query | SQL | Schema |
|---|---|---|---|
| 1 | "List students who joined last April" | select * from students where to_char("mm", admission_date) >= "04" and . . . | Schema=Students: Create Table Students( student_id integer, admission_date datetime, ..) |
| 2 | "find products sold in US" | select * from sales where region=="USA" | Schema=Marketing: Create Table Sales( selling_price integer, region varchar, . . .) |
| 3 | . . . | . . . | . . . |

To overcome these challenges and others, machine learning techniques disclosed herein implement in-context examples—specific, detailed, and relevant information included in the prompt or query to aid the generative artificial intelligence model in generating the correct answer. In-context examples act as anchors, guiding the generative artificial intelligence model's attention to the precise task or framework in question, reducing ambiguity and improving the model's ability to tailor its response. By narrowing the scope of the inquiry and providing a concrete reference point, in-context examples help align the generative artificial intelligence model's output with the user's expectations and increase the accuracy and reliability of its answers in complex or specialized scenario such as Text-to-SQL.

The task of in-context learning is to retrieve the best K-demonstrations for a given query so as to maximize the performance of the Text-to-SQL task. At test time and in production phase, a NL question such as "Fetch payments from last April" and a database schema such as "Fusion: create table Payments" are provided to and/or obtained by the Text-to-SQL system (see Table. 1). Additionally, in accordance with various embodiments, one or more memory banks are provided to and/or obtained by the Text-to-SQL system. The one or more memory banks include various candidate example <NL query, sql, schema>tuples of the form shown Table 2 that can be used for in-context learning.

In a zero-shot setting, a prompt associated with the test example is constructed without relying on any information from the memory bank. In contrast, in a N-shot In-Context-Learning (ICL) approach, N candidate examples are retrieved from one or more memory banks, which would then be included as demonstrations in the prompt for the test example or production utterance. The overall goal is to retrieve high quality demonstrations so that the N-shot ICL approach achieves a superior performance to that of the zero-shot approach using the same generative artificial intelligence model.

In an exemplary embodiment, a method associated with the N-shot ICL approach comprises acquiring a natural language utterance and a database schema, and searching, using at least a portion of the natural language utterance as a key, a memory bank for one or more in-context examples that are relevant to the key. The memory bank comprises in-context examples, and each of the in-context examples comprises an illustrative natural language utterance, an illustrative logical form corresponding to the illustrative natural language utterance, and an illustrative database schema. The method further comprises generating a prompt comprising the natural language query, the database schema, and the one or more in-context examples, transmitting the prompt to a pretrained generative artificial intelligence model, receiving, from the first pretrained generative artificial intelligence model, a logical form corresponding to the natural language utterance based at least in part on the prompt, executing the logical form on a database to obtain a query result, and providing the query result to a user.

To this end, various embodiments described herein further pertain to collecting high quality demonstrations (<textual NL query, SQL pairs>) continuously at runtime, post deployment at the customer site. Further, the collected examples may belong to the same schema as that of the subsequent future test or production queries, leading to high-quality same-schema demonstrations for ICL. In many customer applications, it is possible to obtain direct feedback from the end user, either implicitly when the user-workflow leads to a successful completion, or explicitly when the end user is posed a question such as "are you satisfied with our response on this visit" to which the end user can response with a thumbs-up or thumbs-down. Such successful customer journeys can then be post-processed and the corresponding <text, sql>pairs in that session can be added into a memory bank. Thus, the memory bank can grow into a big collection of diverse high-quality examples that would offer highly similar demonstrations to much of the future test or production examples. In certain embodiments, a vector-database with a similarity search index (described in detail herein), can serve as a memory bank that can easily scale from few thousands of demonstrations and beyond. The ICL approach where a same-schema is present have been evaluated on a public Spider-test set and an internal dataset and have demonstrated significant performance boosts, e.g., a 4% performance improvement (81%→85%) on the spider test set, a 8% performance improvement (57%→65%) on the internal dataset-simplest, and a 30+% performance improvement (40%→73%) on the internal dataset-simpler dataset.

In addition, when a new customer or user is onboarded to a Text-to-SQL service, it is likely that the memory bank will not have any examples belonging to that of the customer or user's database schema. To address this situation of a cold start for the customer, some embodiments include an approach to load up the memory bank with examples from a different database schema. However, high quality demonstration-retrieval is harder in a cross-schema setting and for this purpose a pattern-based-retrieval technique is used for fetching in-context-examples from memory bank. In pattern-based ICL, NL utterances are transformed into category specific patterns. For example, for "date-time category" a NL question such as "fetch all payments made in last May" is transformed to "in last May". Unlike typical ICL that uses NL utterances as the key while searching for relevant demonstrations in the memory bank, pattern-based ICL uses the extracted patterns as the key. The pattern-based-retrieval approach has been evaluated on two datetime datasets (Fusion100 and Fusion500) and showed a significant performance boost, e.g., a 15% performance boost (45.87%→61.46%) on Fusion100 test set, a 1.6% performance boost on (79.67% 81.28%) on Fusion500 test set (with the baseline accuracy already at a high 79%, this corresponds to a 10% (20.33% error 18.22% error) achieved by Pattern-based-ICL), and on non-datetime test sets, namely internal dataset, pattern-based ICL did not cause any regression.

Overview of Agents and NL2SQL Framework

An agent (also referred to as a skill, chatbot, chatterbot, talkbot, digital assistant, or the like) is a computer program that can perform conversations with end users. The agent can generally respond to natural-language messages (e.g., questions or comments) through a messaging application that uses natural-language messages. Enterprises may use one or more agent systems to communicate with end users through a messaging application. The messaging application, which may be referred to as a channel, may be an end user preferred messaging application that the end user has already installed and familiar with. Thus, the end user does not need to download and install new applications in order to chat with the agent system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

End users may interact with the agent system through a conversational interaction (sometimes referred to as a conversational user interface (UI)), just as interactions between people. In some cases, the interaction may include the end user providing a utterance such as query: "Please retrieve all invoices greater than ten thousand dollars for the last four years for Customer Y", to the agent, and the agent responding with a natural language response for the query based on translation of the user's natural language query to a SQL query and execution of the SQL query on an appropriate database.

In some embodiments, the agent system may intelligently handle end user interactions without interaction with an administrator or developer of the agent system. For example, an end user may send one or more messages to the agent system in order to achieve a desired goal. A message may include certain content, such as natural language text, audio, image, video, or other method of conveying a message. In some embodiments, the agent system may convert the content into a standardized logical form (e.g., a SQL query). The agent system may also prompt the end user for additional input parameters or request other additional information. In some embodiments, the agent system may also initiate communication with the end user, rather than passively responding to end user utterances. Described herein are various techniques for identifying an explicit or implicit invocation of an agent system and determining an input for the agent system being invoked.

FIG. 1 depicts a simplified diagram of an environment 100 incorporating an exemplary NL2SQL tool, according to various embodiments. Environment 100 includes an NL2SQL tool 104 that enables users 101 to receive (i) a translated version of a natural language utterance 102 (e.g., a natural language query translated into a given programming language such as SQL), and/or (ii) a result of executing an action related to a natural language utterance 102 (e.g., a natural language query translated into a given programming language such as SQL, which is then executed on a database to retrieve a result for query). As shown in FIG. 1, the NL2SQL tool 104 is configured to generate a SQL query 106 and one or more SQL query result(s) 110 based on the provided natural language utterance 102, however other examples may implement tasks in addition to or alternative to SQL query generation (e.g., schema checking, schema linking, sentence completion, extraction of key information, debugging, and other SQL related tasks). The NL2SQL tool 104 can be implemented using software only, hardware only, firmware only, or any combination of hardware, software, and/or firmware. In some instances, the environment 100 is part of an Infrastructure as a Service (IaaS) cloud service (described in more detail with respect to FIGS. 7-11) and the NL2SQL tool can be implemented as part of the IaaS by leveraging the scalable computing resources and storage capabilities provided by the IaaS provider to process and manage large volumes of data and complex computations. This setup can allow the NL2SQL tool 104 to deliver real-time, responsive interactions while ensure high availability, security, and performance scalability to meet varying demand levels. The NL2SQL tool 104 can be embodied or implemented in various physical systems or devices, such as in a computer, a mobile phone, a watch, an appliance, a vehicle, and the like. For the purposes of this example, the NL2SQL tool 104 generates and accepts queries related to SQL, but it should be understood that the techniques described herein are not limited to SQL and the NL2SQL tool 104 can be configured as any other NL2LF tool capable of generating queries and statements using other programming languages (e.g., PRQL, GraphQL, WebAssembly, Python, R, Java, NIQL, and the like).

As illustrated in FIG. 1, a user 101 provides a user input to the NL2SQL tool 104. The user input can be or can include a natural language utterance 102. The natural language utterance can be in text form, such as when the user types a sentence, a question, a text fragment, or phrase and provides it as an input to the NL2SQL tool 104 via client device(s) 103. The client devices(s) 103 can be configured to communicate with the NL2SQL tool 104, provide the natural language utterance 102 to the NL2SQL tool 104 and receive outputs from the NL2SQL tool 104. In some implementations, the natural language utterance 102 can be in speech form, which may be converted to text form and provided to the NL2SQL tool 104. As an example, a natural language utterance 102 such as 102*a* "Show me all the students who got an A in math" can be spoken by the user 101 and the NL2SQL tool 104 may be configured as a standalone or via a plug-in, or make use of some other audio-to-text translator, configured to translate the audio into text for further processing.

The NL2SQL tool 104 may be or may make use of one or more generative artificial intelligence models such as LLMs configured to generate a SQL query 106 (e.g., 106*a* or 106*b*) based on the natural language utterance 102. The NL2SQL tool 104 may receive a prompt including the natural language utterance 102 to generate a SQL query 106 that it is relevant to the user 101 preferences. In some implementations, the user 101 and/or client device 103 generate a prompt including the natural language utterance 102 before providing the prompt to the NL2SQL tool 104. In other implementations, the NL2SQL tool 104 receives the natural language utterance 102 and generates the prompt itself, e.g., populates slots of a prompt template, before providing the prompt to a trained generative artificial intelligence model.

The NL2SQL tool 104 converts the natural language utterance 102 (as in example 1 depicted in FIG. 1) to the SQL query 106. The NL2SQL tool 104 may consider schema information corresponding to one or more databases 108 to generate the SQL query 106. The SQL query 106 (as in examples 2 or 3 depicted in FIG. 1) may be executed on database(s) 108 to obtain a SQL result 110. As a non-limiting example, SQL result 110 can be a list of students who got an A in math based on a generated SQL query 106. The SQL result(s) 110 can be provided back to the user 101 by the NL2SQL tool 104. In some instances, the SQL result(s) 110 are reported back to the user 101 as raw output. In other instances, the SQL result(s) 110 are reported back to the user 101 as part of a natural language response (e.g., a summary) generated by the one or more generative artificial intelligence models in response to the natural language utterance 102. In other instances, the SQL result(s) 110 are reported back to the user 101 as part of a natural language response (e.g., a summary) generated by the one or more generative artificial intelligence models and/or with a visualization (e.g., a bar chart, pie chart, table, or the like) generated by one or more generative artificial intelligence models and/or analytic subsystems in response to the natural language utterance 102. The user 101 may receive the SQL result(s) 110 through the client device(s) 103. Additionally or alternatively, the NL2SQL tool 104 may provide the SQL query 106 to the user(s) via some other means such as an email communication, SMS message, or other type of notification receivable on one or more other computing devices. In some implementations, the SQL query 106 is provided to the user(s) in addition to or without running the SQL query 106 on the database(s) 108 to obtain SQL result(s) 110 (e.g., as part of a feedback request to validate the SQL query 106).

Figure 2:
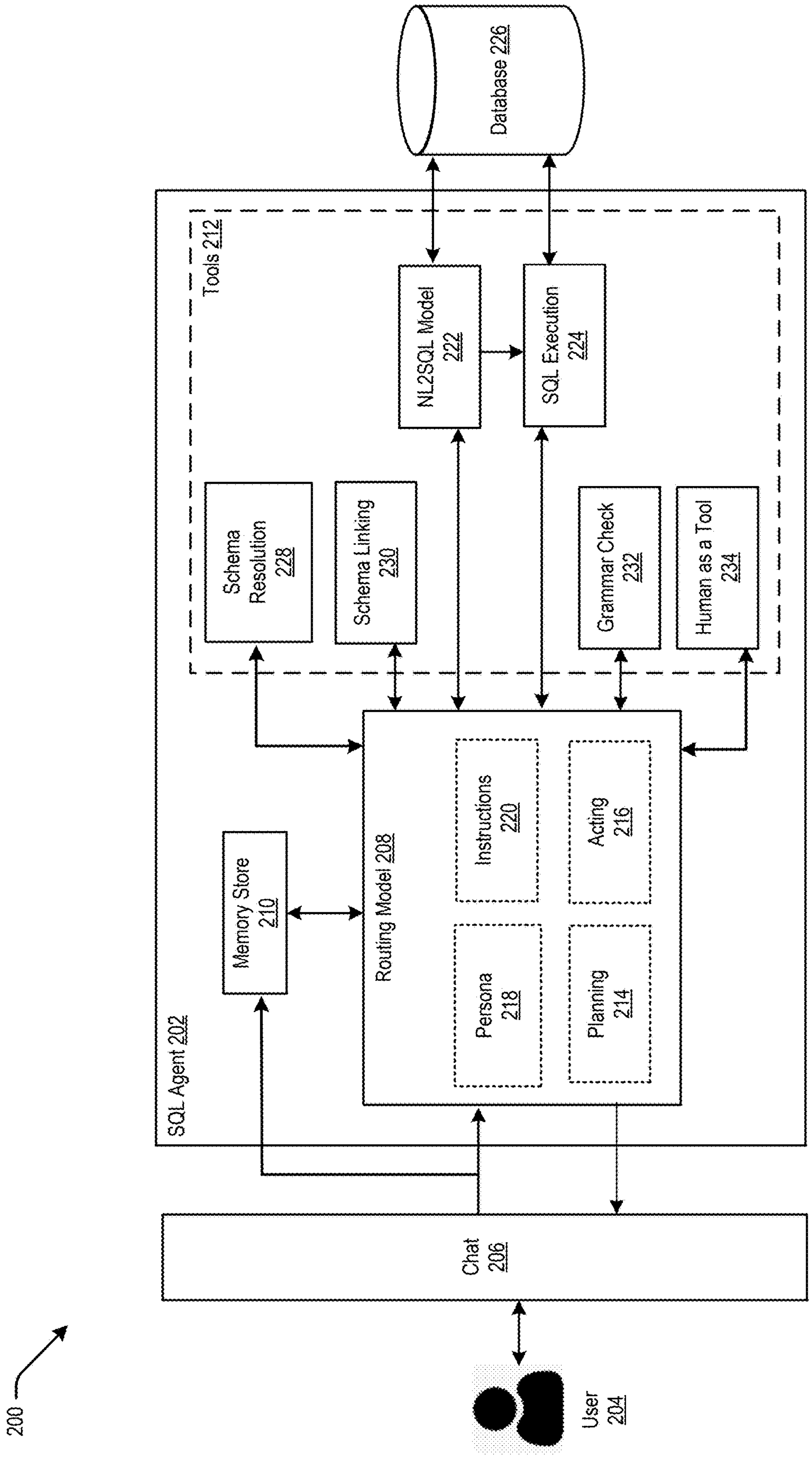
FIG. 2 depicts a simplified diagram for an example generative AI SQL agent, according to various embodiments.

FIG. 2 is a simplified block diagram of a SQL agent system 200 according to certain embodiments. SQL agent system 200 is a computing system that can be implemented in software only, hardware only, firmware only, or any combination of hardware, software, and/or firmware. The SQL agent system 200 can convert natural language questions into SQL to help users complete their data related tasks by leveraging the power of generative artificial intelligence such as LLMs. In addition to their language capabilities (e.g.: sentence completion, summarization, extraction of key information from text passages), generative artificial intelligence can generate SQL statements. The purpose of the SQL agent system 200 is to enable users to talk to their databases with the least amount of effort. This may include the SQL agent system 200 interpreting user requests in natural language, reviewing database schema, implementing schema linking (i.e. identify names of tables and columns in natural language questions), generating SQL queries and even executing the SQL statements. In certain embodiments, the SQL agent system 200 can be used to implement one or more tools related to SQL generation, execution, and/or review (e.g., NL2SQL tool 104 as described with respect to FIG. 1). The SQL agent system 200 can include a SQL agent 202 capable of converting a natural language question into a SQL query.

A user 204 can participate in a chat 206 (also described herein as a conversation or an interaction) with the SQL agent 202. The user 204 may interact with the chat 206 via a user interface such as a graphical user interface or conversational user interface. As an example, the user 204 may provide a user input to the SQL agent 202 via a user interface element such as a chat window. The chat 206 can include one or more inputs from the user 204 and one or more responses from the SQL agent 202. The chat 206 may correspond to one or more chat sessions between the user 204 and the SQL agent 202. During the chat 206, the user 204 provides a natural language utterance that can be processed by the SQL agent 202. The natural language utterance can include a question related to a database or SQL generation.

One or more user inputs provided by the user 204 via the chat 206 are provided to the SQL agent 202. Included in the SQL agent 202 are a routing model 208, a memory store 210 and tools 212. The routing model 208 and memory store 210 receive user inputs such as natural language utterances from the chat 206. The memory store 210 can store a chat history for the user 204 and contextual information related to the user 204, the chat 206, and/or other pieces of information relevant to the NL2SQL operations such as in-context examples, APIs, external knowledge, and the like. The tools 212 can include functions, APIs, and trained machine learning models that can be used by the SQL agent 202 to interact with external systems (e.g., database 226, external knowledge bases) and/or generate SQL statements.

The routing model 208 may be or may make use of one or more generative artificial intelligence models such as LLMs. The routing model 208 can include a planning 214 component and an acting 216 component (i.e., trained task). Planning 214 includes generating a plan that is comprised of a sequence of steps for execution (acting 216), which includes executing the steps in a generated plan using one or more tools 212. In some examples, the routing model 208 may retrieve contextual information related to the user 204 and/or chat 206 from the memory store 210 during planning 214 to improve plan generation. Planning 214 may further include determining a new plan based on a result produced by acting 216 and the execution of a previous plan.

One or more tools 212 supported by the SQL agent 202 may be LLM-based tools configured to receive a prompt and generate a result based at least in part on the prompt. As an example, the tools 212 can include an LLM-based NL2SQL model 222 that generates a SQL statement based on a prompt including a natural language utterance provided by the user 204 (e.g., as described in FIG. 1). In some instances, the routing model 208 can generate a prompt based on a natural language utterance received from the user 204. In some examples, steps for generating a prompt can be included in a plan generated by planning 214 and the prompt may be generated by acting 216. A prompt can include a persona 218 and instructions 220. The persona 218 can be selected from a set of available personas (see Table 3 for a non-limiting list of exemplary personas). Including the persona 218 in a prompt for an LLM may improve accuracy of generated responses and customize responses generated by an LLM to the needs of the user 204. In some examples, planning 214 may select a tool from the tools 212 based on the persona 218.

TABLE 3

| Example Persona | Example Description |
|---|---|
| Junior Developer | A user having limited to no experience in writing SQL queries that requires assistance in writing and optimizing SQL queries. |
| Expert Developer | A user with several years of experience writing SQL queries. |
| Business Analyst | A user with strong context about the needs of a company and wants quick data insights without deep SQL knowledge. |
| Data Scientist | A user focused on extracting and analyzing data efficiently. |

Instructions 220 describe the knowledge bases and tools available to the SQL agent 202. Instructions 220 can be included in a prompt for LLM-based tools and may guide a tool to generate a response relevant to preferences of user 204. Additionally, or alternatively, the prompt can include a table schema, description of columns in the table schema, context, in-context examples, additional instructions, a user question, or any combination thereof. In some examples, context may include contextual information related to the user 204 and/or chat 206 history and may be retrieved from the memory store 210 by the routing model 208. The prompt may further include database schema information corresponding to a database 226.

The routing model 208 may provide the generated prompt to a tool from the tools 212 selected by planning 214. As an example, the NL2SQL model 222 receives a prompt provided by the routing model 208 and generates a SQL query based on the prompt. The NL2SQL model 222 can be trained to convert a natural language question into a SQL query to help the user 204 complete data related tasks. In some examples, the SQL query generated by the NL2SQL model 222 is returned to the user 204 via the chat 206. Additionally, or alternatively, the generated SQL query is provided to a SQL execution 224 tool that is configured to execute SQL queries on the database 226. SQL execution 224 may receive a SQL result from the database 226 and provide the SQL result to the routing model 208. The routing model 208 may provide the SQL result to the user 204 via the chat 206. In some implementations, the routing model 208 may identify an error in the SQL result or determine the SQL query and/or result does not correspond to user 204 needs and generate new plan using planning 214 to correct the error or generate a new SQL query.

Additional examples of tools include, but are not limited to, schema resolution 228, schema linking 230, grammar check 232, and human as a tool 234. Schema resolution 228 may be configured to check for and/or fix any errors within a SQL statement. The SQL agent 202 may use schema resolution 228 after a SQL query is generated by the NL2SQL model 222. Schema linking 230 may be configured to identify proper references to schema values (e.g., tables, columns, condition values) based on schema information and query patterns. Schema linking 230 can include content-based schema linking for mapping values, and name-based schema linking for mapping table and column names for SQL generation. For large schemas, retrieval augmented generation (RAG)-based schema linking may be implemented to retrieve a relevant subset of the schema. Schemas can be stored in a knowledge base (e.g., memory store 210) and relevant schema information can be retrieved based on a natural language query provided by the user 204. In some implementations, the knowledge base includes external data stores and schema linking 230 can include performing a web search to identify relevant schema. The SQL agent 202 may be unable to resolve ambiguities during schema linking 230. In such examples, the SQL agent 202 can ask the user 204 clarifying questions to resolve the ambiguities and/or acquire missing information to resolve the ambiguities.

Also included in the tools 212 is a grammar check 232 that can review grammar of generated statements. Tools 212 can also include human as a tool 234. The SQL agent 202 may seek human input for clarification and disambiguation. Human as a tool 234 may be used to supplement one or more additional tools of the set of tools 212 with human input or intervention. Human as a tool 234 can include asking the user 204 or another user such as a developer for information for correcting previous generations.

The SQL agent 202 may use a singular tool or a combination of tools 212 to generate a response to the user 204. The routing model 208 can select a tool and/or generate a prompt for the selected tool based on a natural language utterance received via the chat 206. The routing model 208 receives an output from the selected tool based on the prompt and/or context provided to the selected tool. In some implementations, the output generated by the selected tool is provided to the user 201 via the chat 202 as received by the routing model 208 (i.e., without additional modifications to the output).

In some implementations, the routing model 208 responds to the user 204 which provided the original query as part of a two-way conversation (e.g., via chat 206). The natural language response may include a natural language component (e.g., answers to questions, information, etc.) and/or a logical form component (e.g., a SQL query). In some embodiments, the routing model 208 may generate a natural language response containing the output generated by the selected tool. The routing model 208 may be configured to generate the natural language response and/or may use a response generation tool to generate the natural language response. The natural language response can be provided to the user 201 via the chat 206. In some implementations, the SQL agent 202 may provide a visualization of the generated output through a plot, table, graph, and the like, via the chat 206. As a particular example, the SQL agent 202 can use the schema linking 230 tool to identify names of table and columns in a natural language utterance (which is an example of NL utterance 102 with respect to FIG. 1) provided by the user 204 and then generate a SQL query using the NL2SQL model 222 based on the identified table and column names. The SQL query may be provided to the user 201 via the chat 202 as generated by the NL2SQL model 222. In some implementations, the routing model 208 may generate a natural language response containing the SQL query and provide the natural language response to the user 201 via the chat 202.

Figure 3:
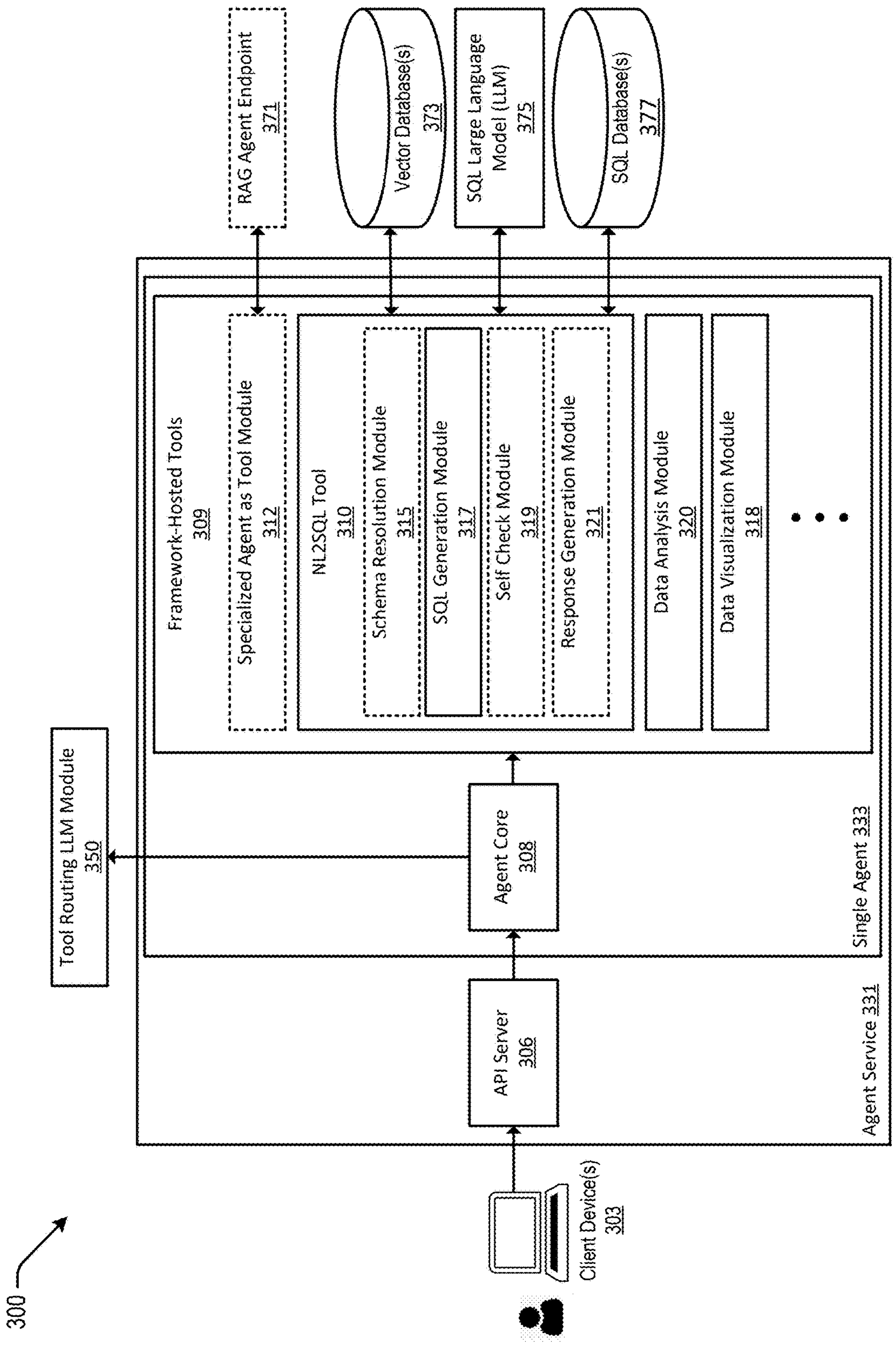
FIG. 3 depicts a simplified diagram for an example generative AI SQL agent, according to various embodiments.

FIG. 3 depicts a simplified diagram 300 for an example generative AI SQL agent, according to various embodiments. As discussed in regard to FIGS. 1 and 2, user(s) (e.g., users 101 or 204) may use client device(s) 303 to submit a NL utterance and/or question to an agent service 331 by way of an API server 306. The API server 306 may be a software, hardware, and/or firmware component that enables one or more applications (e.g., cloud applications) to enable communication as an intermediary between the client device(s) 303 and the agents. The API server 306 may identify a specific agent (e.g., single agent 333), or multiple agents, to handle the instance (e.g., by agent specialty or user preference) and select an agent core 308. The agent core 308 may be configured with pass-through routing or, if additional tools are included in the agent, a specific routing (e.g., ReAct routing) may be implemented. The agent core 308 may handle multi-step (or iterated) SQL resolution, generation, and/or execution. By way of a non-limiting example, in analytical use cases using unique software packages (e.g., Oracle™ Analytics Cloud (OAC), Tableau™, etc.), a single analytical dashboard may generate multiple SQL queries using output from previous inputs (e.g., by way of Churn analysis, Funnel analysis, cohort analysis, etc.). The agent core 308 may access a tool routing LLM module 350 in order to identify, select, utilize, and/or train one or more LLM(s) that may suitably apply to the utterance received from the client device(s) 303.

The agent core 308 may include one or more framework-hosted tools 309 for addressing various functions. For example, the framework-hosted tools 309 may include a specialized agent as tool module 312 which may be in communication with a retrieval augmented generation (RAG) endpoint 371. The RAG endpoint 371 may improve an efficacy of one or more LLMs by suitably leveraging various sources of data. For example, retrieving data/documents relevant to the utterance (e.g., question, statement, task, etc.) and providing them as context for the LLM as either labeled or unlabeled data. The RAG endpoint 371 may provide support to the agent core and maintain up-to-date information based at least in part on other trained LLMs and/or agent cores (not depicted), and/or access domain-specific knowledge.

Included in the frame-work hosted tools 309 is a NL2SQL tool 310, which is an example of the NL2SQL model 218 with respect to FIG. 2. The NL2SQL tool 310 includes, without limitation, modules 315, 317, 319, and 321. Schema resolution module 315 may function to receive input from the client device(s) 303 requesting the NL2SQL tool 310 check one or more schema for any errors (e.g., syntax errors, sematic errors, etc.) and fix the errors (or recommend a fix). The agent core 308 may provide explanations to the client device(s) 303 about each fix performed. The explanations may be provided in natural language. In some examples, the NL2SQL tool 310 may attempt to automatically resolve the errors if possible and ask clarification questions (e.g., as output to the client device(s) 303) where suitably needed. If the error cannot be resolved, the error may be displayed to the user(s). As an example, the different types of errors that an agent core 308 (which is an example component of SQL agent 202 with respect to FIG. 2) may return can include syntax errors and semantic errors. The schema resolution module 315 may reference one or more vector database(s) 373 to obtain and/or store schema.

Also included in the NL2SQL tool 310 is a SQL generation module 317. The SQL generation module 317 may take the utterance received from the client device(s) 303 and construct a SQL query. To do this, the NL2SQL tool 310 may access one or more generative artificial intelligence models such as LLMs (e.g., SQL LLM 375) that may have been trained on generating SQL queries. An LLM may receive the utterance from the NL2SQL tool 310 and may translate the utterance into a relevant SQL query. The SQL generation module 317 may then pass the received SQL query from the LLM to one or more additional modules. For example, the SQL generation module 317 may pass the SQL query returned from the LLM to a response generation module 321. The response generation module 321 may append the SQL query (optionally along with information related to the utterance) and return the SQL query to the client device(s) 303. In addition, or alternatively, the response generation module 321 may pass the SQL query to one or more SQL database(s) 377 to retrieve information related to the utterance. The NL2SQL tool 310 may utilize a self-check module 319, which may function with any one or more of the other modules. The self-check module 319 may automatically try to resolve errors associated with the SQL query and/or LLM prompt containing the utterance. The self-check module 319 may ask clarifying questions to the client device(s) 303 and/or the LLM to resolve the errors.

The framework-hosted tools 309 includes data analysis module 320 and a data visualization module 318. Each of 320 and 318 may function with any of the modules of the framework-hosted tools 309 in order to analyze various analytics and display the various analytics. The analytics may include analysis of schema, SQL queries, LLM accuracy, recommendations, or suitable equivalents.

Figure 4:
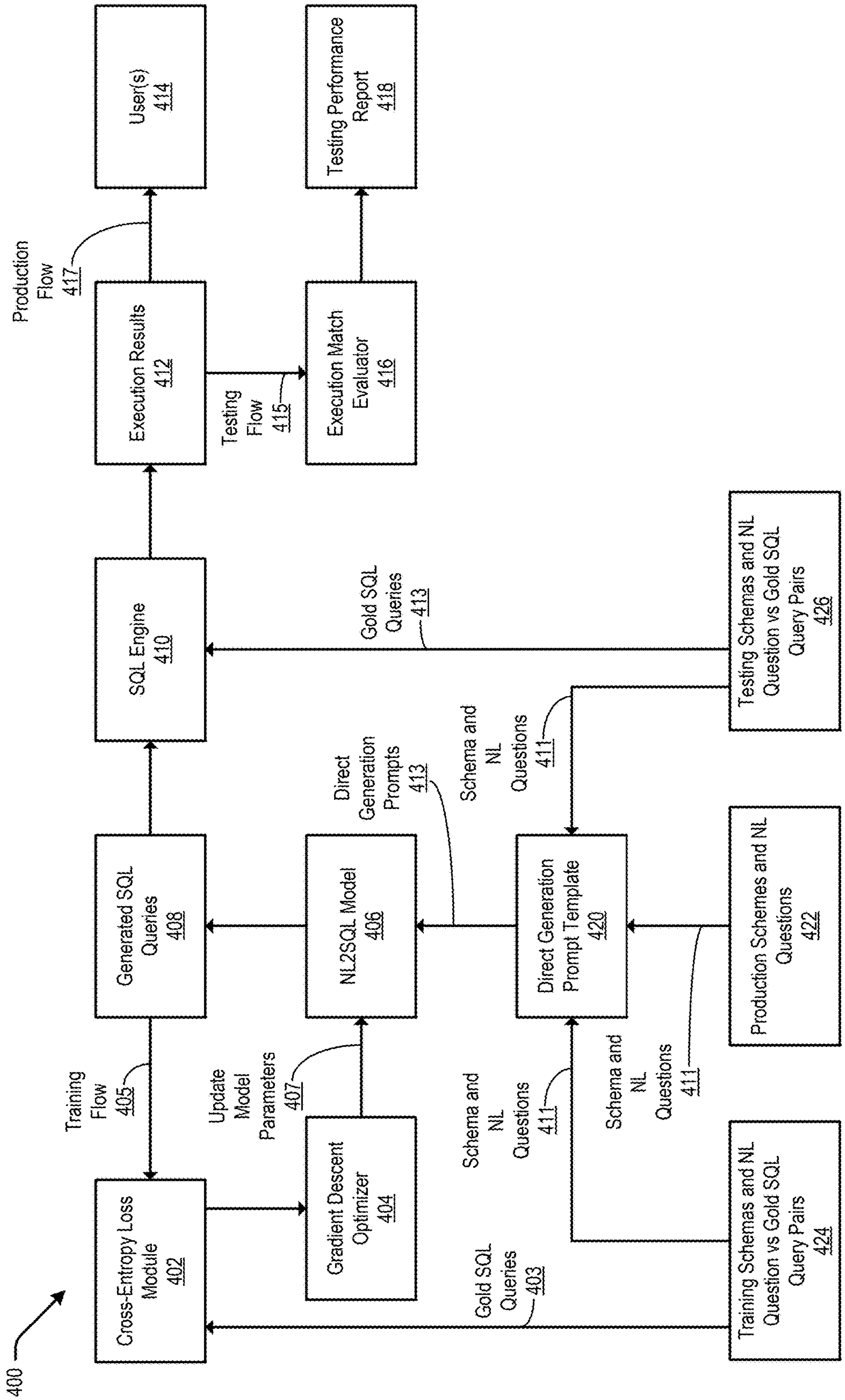
FIG. 4 depicts a simplified block diagram for training, testing, and producing an NL2SQL Model, according to various embodiments.

FIG. 4 depicts a simplified block diagram 400 for training, testing, and deployment or production of an NL2SQL Model, according to various embodiments. This simplified overview of training, testing, and inference depicts flows for a NL2SQL direct generation model (however it should be understood that similar steps could be implemented for a generation model that translates to an intermediate database query language which can be used to generate a query in a specific system query language or other for a generation model that translates to another programming language such as PRQL, GraphQL, WebAssembly, Python, R, Java, NIQL, and the like). A NL2SQL model is powered by a machine learning model (e.g., an LLM) configured to convert a NL utterance (e.g., a query posed by a user using an agent) into a logical form, for example, an intermediate database query language such as OMRL or a system query language format, such as SQL or PGQL. If an intermediate database query language format is used then the intermediate database query language can be used to generate a query in a specific system query language (e.g., SQL), which can then be executed for querying a system such as a database to obtain an answer to the user's utterance. If a system query language format is used, then the system query language can be directly executed for querying a system such as a database to obtain an answer to the user's utterance.

One goal of the NL2SQL model is to allow end users to interact with their systems, (e.g., SQL databases) through natural language rather than program specific language queries such as SQL queries. Using a NL2SQL service, users such as business analysts can extract information from their systems without thorough knowledge of a specific programming language and system schemas. The NL2SQL model is an LLM, which is an advanced type of artificial intelligence model designed to understand and generate human language. These models are trained on vast amounts of text data and leverage deep learning techniques to perform a variety of natural language processing tasks, such as text generation, translation, summarization, and answering questions. In the below description, the LLM (NL2SQL model) is designed and trained to convert natural language queries into SQL queries. This involves understanding the semantics of the natural language input, mapping it to the corresponding database schema, and generating a syntactically and semantically correct SQL query that can retrieve the desired information from the database. However, it should be understood that similar techniques could be implemented for other programming languages including other system query languages such as PGQL and/or other intermediate logical forms such as MRL or OMRL.

The input to the Natural Language-to-SQL (NL2SQL) model is a natural language question.

For example:

"Get me the list of employees from Australia."

The main output from the NL2SQL model is a SQL query.

For example:

SELECT employee_id, employee_name FROM Employee WHERE country="Australia".

Another important input to the NL2SQL model 406 is the database schema that helps the model to identify relevant tables and columns in the SQL output construction.

For example:

```
CREATE TABLE Employee (
 employee_id TEXT(12) NOT NULL,
 employee_name TEXT(100) NOT NULL,
 birth_date DATE NOT NULL,
 hire_date DATE NOT NULL,
 country TEXT(100),
 ...
)
CREATE TABLE JobTitle (
 ...
)
...
```

Described herein is a pre-trained NL2SQL model developed based on instruction fine-tuning of LLMs to provide this NL2SQL direct generation capability, e.g., the mapping of (Database Schema, NL Question)→SQL Query. Below is the summary of how the NL2SQL direct generation capability is implemented via instruction fine-tuning.

Data to train a NL2SQL model includes multiple database schemas defined as SQL CREATE TABLE statements:

- Table names
- Column names and types
- Primary and foreign keys
- Other constraints One Database Schema Example:

```
CREATE TABLE aircraft (
 aid NUMERIC(9, 0),
 name TEXT(30),
 distance NUMERIC(6, 0),
 PRIMARY KEY (aid)
)
```

-continued

```
CREATE TABLE employee (
 eid NUMERIC(9, 0),
 name TEXT(30),
 salary NUMERIC(10, 2),
 PRIMARY KEY (eid)
)
CREATE TABLE certificate (
 eid NUMERIC(9, 0),
 aid NUMERIC(9, 0),
 PRIMARY KEY (eid, aid),
 FOREIGN KEY(aid) REFERENCES aircraft (aid),
 FOREIGN KEY(eid) REFERENCES employee (eid)
)
CREATE TABLE flight (
 flno NUMERIC(4, 0),
 origin TEXT(20),
 destination TEXT(20),
 distance NUMERIC(6, 0),
 departure_date DATE,
 arrival_date DATE,
 price NUMERIC(7, 2),
 aid NUMERIC(9, 0),
 PRIMARY KEY (flno),
 FOREIGN KEY(aid) REFERENCES aircraft (aid)
)
```

Each database schema can be associated with multiple pairs of natural language questions and corresponding SQL queries.

Example of NL Question and corresponding SQL Query:

NL Question: "What is the name of the employee with salary greater than 100000 and with the most certificates to fly planes more than 5000?"

SQL Query: "SELECT T1.name FROM employee AS T1 JOIN certificate AS T2 ON T1.eid=T2.eid JOIN aircraft AS T3 ON T2.aid=T3.aid WHERE T3.distance >5000 AND T1.salary >100000 GROUP BY T1.eid ORDER BY count (*) DESC LIMIT 1"

Each question-query pair and its corresponding database schema are populated following a NL2SQL direct generation prompt template to create one direct generation prompt example:

Direction NL2SQL Generation Prompt Example:

Given an input Question, create a syntactically correct Oracle SQL query to run.

Pay attention to using only the column names that you can see in the schema description. Be careful to not query for columns that do not exist. Also, pay attention to which column is in which table.

Please double check the SQL query you generate.

DO NOT use alias in the SELECT clauses.

Only use the tables listed below.

```
CREATE TABLE aircraft (
 aid NUMERIC(9, 0),
 name TEXT(30),
 distance NUMERIC(6, 0),
 PRIMARY KEY (aid)
)
CREATE TABLE employee (
 eid NUMERIC(9, 0),
 name TEXT(30),
 salary NUMERIC(10, 2),
 PRIMARY KEY (eid)
)
CREATE TABLE certificate (
 eid NUMERIC(9, 0),
 aid NUMERIC(9, 0),
 PRIMARY KEY (eid, aid),
 FOREIGN KEY(aid) REFERENCES aircraft (aid),
 FOREIGN KEY(eid) REFERENCES employee (eid)
)
```

-continued

```
CREATE TABLE flight (
 flno NUMERIC(4, 0),
 origin TEXT(20),
 destination TEXT(20),
 distance NUMERIC(6, 0),
 departure_date DATE,
 arrival_date DATE,
 price NUMERIC(7, 2),
 aid NUMERIC(9, 0),
 PRIMARY KEY (flno),
 FOREIGN KEY(aid) REFERENCES aircraft (aid)
)
Question: What is the name of the employee with salary greater than
100000 and with the most certificates to fly planes more than 5000?
SQL: "SELECT T1.name FROM employee AS T1 JOIN certificate
AS T2 ON T1.eid = T2.eid JOIN aircraft AS T3 ON T2.aid = T3.aid
WHERE T3.distance > 5000 AND T1.salary > 100000 GROUP BY
T1.eid ORDER BY count(*) DESC LIMIT 1"
```

The prompt example can then be sent to the LLM model to generate the SQL query during training and testing phases. The gold (ground truth) SQL Query: "SELECT T1.name FROM employee AS T1 JOIN certificate AS T2 ON T1.eid=T2.eid JOIN aircraft AS T3 ON T2.aid=T3.aid WHERE T3.distance >5000 AND T1.salary >100000 GROUP BY T1.eid ORDER BY count (*) DESC LIMIT 1" is used to evaluate the generated SQL query using a loss function such as cross-entropy loss (e.g., using cross-entropy loss module 402) in training and a performance metric such as execution match in testing. For execution match, both gold and generated SQL queries are executed on the database using the SQL engine. Their result sets are compared to check if they are matched.

The training and testing flows start at either a training schemas and NL question versus (vs) gold SQL query pairs block 424 or a testing schemas and NL question versus gold SQL query pairs block 426, respectively, where training and testing data is collected (e.g., acquired or accessed). The data collection can include exploring various data sources such as public datasets, private data collections, or real-time data streams, depending on a project's needs. In some instances, a data source is a public or online repository of information or examples pertinent to a general or target domain space. Many domains have publicly available datasets provided by governments, universities, or organizations. For example, many government and private entities offer datasets on healthcare, environmental data, and more through various portals. For proprietary needs, data might be available through partnerships or purchases from private companies that specialize in data aggregation. In other instances, a data source is a private repository of information or examples pertinent to a general or target domain space. For example, a data source can be a storage device that stores various schemas and natural language questions (including labels for corresponding gold SQL queries 403, 413).

Preprocessing may be performed on the training and testing data (from 424, 426 respectively), serving as a bridge between raw data acquisition and effective model training. The primary objective of preprocessing is to transform raw data into a format that is more suitable and efficient for analysis, ensuring that the data fed into machine learning algorithms is clean, consistent, and relevant. This step can be useful because raw data often comes with a variety of issues such as missing values, noise, irrelevant information, and inconsistencies that can significantly hinder the performance of a model. By standardizing and cleaning the data beforehand, preprocessing helps in enhancing the accuracy and efficiency of the subsequent analysis, making the data more representative of the underlying problem the model aims to solve. At block 420, the preprocessing includes populating the training and testing data (e.g., schema and NL questions 411) into the direct generation prompt template (as described above) to create direct generation prompts 413 from which the NL2SQL model 406 generates SQL queries.

Once collected, generated, preprocessed, and/or labeled, the data may then be split into the training and testing datasets. The training and testing datasets may comprise the raw data and/or preprocessed data. The training and testing datasets are typically split into at least three subsets of data: training, validation, and testing. The training set is used to fit the model, where the machine learning model learns to make inferences based on the training data. The validation set, on the other hand, is utilized to tune hyperparameters and prevent overfitting by providing a sandbox for model selection. Finally, the test set serves as a new and unseen dataset for the model, used to simulate real-world application and evaluate the final model's performance. The process of splitting ensures that the model can perform well not just on the data it was trained on, but also on new, unseen data, thereby validating and testing its ability to generalize.

Various techniques can be employed to split the data effectively, with each method aiming to maintain a good representation of the overall dataset in each subset. A simple random split (e.g., a 70/20/10%, 80/10/10%, or 60/25/15%) is the most straightforward approach, where examples from the data are randomly assigned to each of the three sets. However, more sophisticated methods may be necessary to preserve the underlying distribution of data. For instance, stratified sampling may be used to ensure that each split reflects the overall distribution of a specific variable, particularly useful in cases where certain categories or outcomes are underrepresented. Another technique, k-fold cross-validation, involves rotating the validation set across different subsets of the data, maximizing the use of available data for training while still holding out portions for validation. These methods help in achieving more robust and reliable model evaluation and are useful in the development of predictive models that perform consistently across varied datasets.

At this stage, hyperparameters may also be acquired or set for the training and testing. The hyperparameters control the overall behavior of the models. Unlike model parameters that are learned automatically during training, hyperparameters are set before training begins and have a significant impact on the performance of the model. For example, in an LLM, hyperparameters include the learning rate, batch size, number of layers, number of attention heads, hidden layer size, dropout rate, weight decay, sequence length, and embedding dimension, among others. These settings can determine how quickly a model learns, its capacity to generalize from training data to unseen data, and its overall complexity. Correctly setting hyperparameters is important because inappropriate values can lead to models that underfit or overfit the data. Underfitting occurs when a model is too simple to learn the underlying pattern of the data, and overfitting happens when a model is too complex, learning the noise in the training data as if it were signal.

At block 420, the direct generation prompts (for the training and testing data) are input into the NL2SQL model (at block 406) via a training and testing subsystem for training and/or testing. The training and testing subsystem is comprised of a combination of specialized hardware and software to efficiently handle the computational demands required for training, validating, and testing a machine learning model. On the hardware side, high-performance GPUs (Graphics Processing Units) may be used for their ability to perform parallel processing, drastically speeding up the training of complex models, especially deep learning networks. CPUs (Central Processing Units), while generally slower for this task, may also be used for less complex model training or when parallel processing is less critical. TPUs (Tensor Processing Units), designed specifically for tensor calculations, provide another level of optimization for machine learning tasks. On the software side, a variety of frameworks and libraries may be utilized, including TensorFlow, PyTorch, Keras, and scikit-learn. These tools offer comprehensive libraries and functions that facilitate the design, training, validation, and testing of a wide range of machine learning models across different computing platforms, whether local machines, cloud-based systems, or hybrid setups, enabling developers to focus more on model architecture and less on underlying computational details.

Training is the initial phase of developing machine learning models such as the NL2SQL model where the model learns to generate SQL queries (output at block 408) based on the data training data (e.g., training flow 405) provided from the training datasets. During this phase, the model iteratively adjusts its internal model parameters to achieve a preset optimization condition. At blocks 402 and 404, the preset optimization condition can be achieved by minimizing the difference between the model output (e.g., generated SQL queries) and the ground truth labels (e.g., gold SQL queries) in the training data. In some instances, the preset optimization condition can be achieved when the preset fixed number of iterations or epochs (full passes through the training dataset) is reached. In some instances, the preset optimization condition is achieved when the performance on the validation dataset stops improving or starts to degrade. In some instances, the preset optimization condition is achieved when a convergence criterion is met, such as when the change in the model parameters falls below a certain threshold between iterations. This process, known as fitting, is fundamental because it directly influences the accuracy and effectiveness of the model.

In an exemplary training phase performed by the training and testing subsystem, the training subset of data is input into the machine learning algorithms to find a set of model parameters (e.g., weights, coefficients, trees, feature importance, and/or biases) that minimizes or maximizes an objective function (e.g., a loss function, a cost function, a contrastive loss function, a cross-entropy loss function, etc.). To train the machine learning algorithms to achieve accurate predictions, "errors" (e.g., a difference between a predicted label and the ground truth label) need to be minimized. In order to minimize the errors (blocks 402 and 404), the model parameters 407 can be configured to be incrementally updated by minimizing the objective function over the training phase ("optimization"). Various different techniques (e.g., stochastic gradient descent) may be used to perform the optimization. For example, to train machine learning algorithms such as an LLM, optimization can be done using back propagation. The current error is typically propagated backwards to a previous layer, where it is used to modify the weights and bias in such a way that the error is minimized. The weights are modified using the optimization function. Other techniques such as random feedback, Direct Feedback Alignment (DFA), Indirect Feedback Alignment (IFA), Hebbian learning, and the like can also be used to update the model parameters in a manner as to minimize or maximize an objective function. This cycle is repeated until a desired state (e.g., a predetermined minimum value of the objective function) is reached.

Validating is another phase of training where the model is checked for deficiencies in performance and the hyperparameters are optimized based on validation data provided from the training datasets. The validation data helps to evaluate the model's performance, such as accuracy, precision, recall, or F1-score, to gauge how well the model is likely to perform in real-world scenarios. Hyperparameter optimization, on the other hand, involves adjusting the settings that govern the model's learning process (e.g., learning rate, number of layers, size of the layers in neural networks) to find the combination that yields the best performance on the validation data. One optimization technique is grid search, where a set of predefined hyperparameter values are systematically evaluated. The model is trained with each combination of these values, and the combination that produces the best performance on the validation set is chosen. Although thorough, grid search can be computationally expensive and impractical when the hyperparameter space is large. A more efficient alternative optimization technique is random search, which samples hyperparameter combinations from a defined distribution randomly. This approach can in some instances find a good combination of hyperparameter values faster than grid search. Advanced methods like Bayesian optimization, genetic algorithms, and gradient-based optimization may also be used to find optimal hyperparameters more effectively. These techniques model the hyperparameter space and use statistical methods to intelligently explore the space, seeking hyperparameters that yield improvements in model performance.

Once a machine learning model has been trained and validated, it undergoes a final evaluation using the test data provided from the training and testing datasets, which is a separate subset of the data that has not been used during the training or validation phases. This step is important as it provides an unbiased assessment of the model's performance in simulating production operation. The test dataset serves as new, unseen data for the model, mimicking how the model would perform when deployed in actual use. During testing, the model's generated SQL queries (output at block 425) can be compared against the true values (e.g., gold SQL queries) in the test dataset using various performance metrics such as accuracy, precision, recall, and mean squared error, depending on the nature of the problem. Additionally, or alternatively, at blocks 410 and 412, the gold and generated SQL queries are executed on the corresponding database using a SQL engine (execution engine; see below in Production Flow section for detailed description) to obtain execution results. At block 416, the result sets (e.g., testing flow 415) from executing the gold and generated SQL queries are compared using an execution match evaluator to compute accuracy execution match metrics. This process helps to verify the generalizability of the model-its ability to perform well across different data samples and environments-highlighting potential issues like overfitting or underfitting and ensuring that the model is robust and reliable for practical applications. The NL2SQL model is fully validated and tested once the outputs have been reported (e.g., testing performance report) and deemed acceptable by user defined acceptance parameters (block 418). Acceptance parameters may be determined using correlation techniques such as Bland-Altman method and the Spearman's rank correlation coefficients and calculating performance metrics such as the error, accuracy, precision, recall, receiver operating characteristic curve (ROC), etc.

The production flow starts at block 422 where production schemas and natural language utterances (real-world input data) are input into the NL2SQL model via a production subsystem for inference. The production subsystem is comprised of various components for deploying machine learning models such as the NL2SQL model in a production environment. In some instances, the NL2SQL resides as a component of a larger system or service (e.g., use with an agent as described with respect to FIGS. 1-3). In some instances, the NL2SQL model and/or the inferences can be used by downstream applications to provide further information. For example, the inferences can be used to hold a conversation with a user as part of an agent or can be used to provide data analysis to a user via an analytical service such as analytics cloud-based service. Deploying the NL2SQL model includes moving the model(s) from a development environment (e.g., the training and testing subsystem, where it has been trained, validated, and tested), into a production environment where it can make inferences on real-world data (e.g., input data). This step typically starts with the model being saved after training, including its parameters and configuration such as final architecture and hyperparameters. It is then converted, if necessary, into a format that is suitable for deployment, depending on the deployment environment. For instance, a model trained in a developmental computing environment such as Python might be converted into a Java-friendly format for integration into a larger enterprise application. Deployment can be conducted on various platforms, including on-premises servers or cloud environments like OCI, AWS, Azure, Google, etc. (see below discussion of various computer and cloud architectures with respect to FIGS. 9-13).

At block 420, the input data (e.g., production schemas and natural language utterances) are populated into the direct generation prompt template (as described above) to create direct generation prompts from which the NL2SQL model generates SQL queries. At block 406, the direct generation prompt is input into the NL2SQL model via the production subsystem for inference. The NL2SQL model then translates the natural language utterance into a SQL query. This translation process includes the NL2SQL model first parsing the natural language utterance to understand the user's intent. This involves identifying the key components of the request, such as the desired action (e.g., SELECT, UPDATE), the entities involved (e.g., tables, columns), and any conditions or filters. For example, if the user says, "Show me all the customers who signed up in the last month," the model identifies the action (retrieve data), the entities (customers), and the condition (signed up in the last month). The NL2SQL model then maps the identified entities and conditions to the corresponding elements in the schema (e.g., database schema). This step requires knowledge of the database structure, including table names, column names, and data types (which is included within the direct generation prompt template). Continuing with the example, the model needs to know that "customers" refers to a specific table, and "signed up" corresponds to a column (e.g., 'signup_date') in that table. Using the parsed intent and mapped schema elements, the NL2SQL model constructs a syntactically correct SQL query. This involves selecting the appropriate SQL keywords and structuring the query according to SQL syntax rules. For the example request, the LLM would generate the following SQL query:

```
"sql
   SELECT * FROM customers WHERE signup_date >=
DATE_SUB(CURDATE( ), INTERVAL 1 MONTH);
"
```

The NL2SQL model may then validate the constructed SQL query to ensure it aligns with the user's intent and adheres to the database schema. This could involve checking for syntax errors, ensuring the correct use of SQL functions, and verifying the query against the schema. If necessary, the NL2SQL model refines the query to better match the user's request or correct any identified issues. This step might also involve asking the user for clarification if the original utterance was ambiguous. Once generated and optionally validated, the NL2SQL model outputs the SQL queries at block 425.

At blocks 410 and 412, the SQL queries are executed on the corresponding database using a SQL engine (execution engine) to obtain execution results. The execution engine executes the SQL queries on a database by following a multi-step process that involves parsing, optimizing, and executing the query. Initially, an SQL query is parsed to create an internal representation, typically an Abstract Syntax Tree (AST), which outlines the structure of the query. The engine then consults the database schema to validate the query, ensuring that all referenced tables, columns, and data types exist and are correctly used. Once validated, the query undergoes optimization, where the execution engine determines the most efficient way to access and manipulate the data, often through the use of query optimization techniques such as indexing, join algorithms, and query rewriting. This step aims to minimize resource usage and execution time. Finally, the optimized query is executed against the database. The execution engine processes the query plan, retrieves the required data from the storage engine, and applies any necessary transformations, such as filtering, sorting, or aggregating. The resulting data is then formatted and returned to the user (or user(s)) by way of production flow 417 or application that issued the query (block 414), completing the process of data retrieval.

To manage and maintain its performance, a deployed model such as the NL2SQL model may be continuously monitored to ensure it performs as expected over time. This involves tracking the model's inference accuracy, response times, and other operational metrics. Additionally, the model may require retraining or updates based on new data or changing conditions in the environment it is applied in. This can be useful because machine learning models can drift over time due to changes in the underlying data the models are making predictions on-a phenomenon known as model drift. Therefore, maintaining a machine learning model in a production environment often involves setting up mechanisms for performance monitoring, regular evaluations against new test data, and potentially periodic updates and retraining of the model to ensure it remains effective and accurate in making predictions.

In-Context Learning for Text-to-SQL with Pattern Based Retrieval

Figure 5:
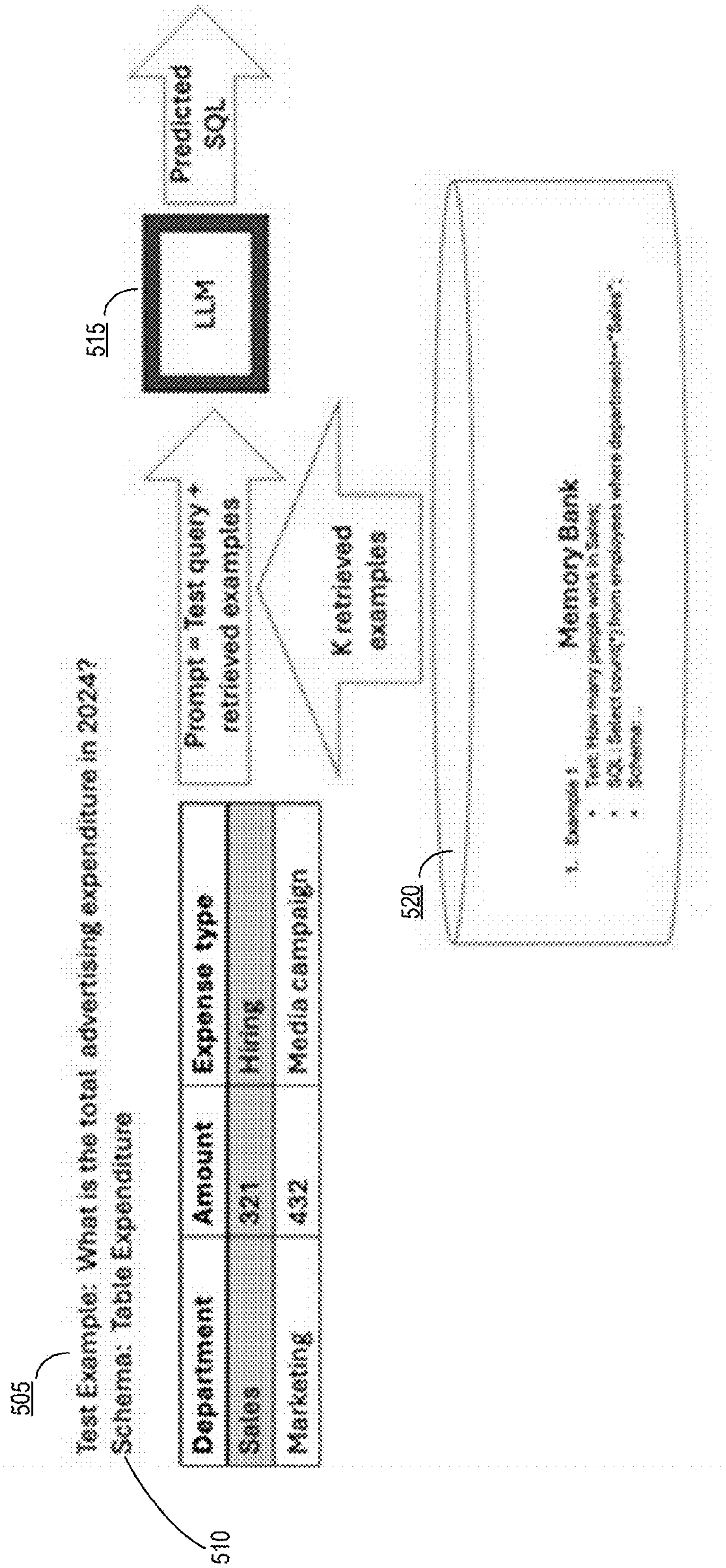
FIG. 5 depicts a simplified block diagram for in-context learning, according to various embodiments.

As discussed above, the task of in-context learning is to retrieve the best K-demonstrations for a given query to maximize the performance of the Text-to-SQL task. As shown in FIG. 5, a NL question 505 such as "What is the total advertising expenditure in 2024" and a database schema 510 such as "Table Expenditure" may be provided to and/or obtained by the Text-to-SQL system (see SQL agent system 200 and components thereof described with respect to FIGS. 1-4) and provided as input to a LLM 515 in a prompt. Additionally, one or more memory banks 520 are provided to and/or obtained by the Text-to-SQL system. The one or more memory banks 520 include various candidate example <NL query, sql, schema>tuples 525 that can be used for in-context learning. In order to retrieve the best K-demonstrations for a given query (e.g., NL question 505) two approaches are disclosed herein. The first approach (common schema ICL) is intended for use in ICL where examples in the one or more memory banks 520 and the given query (e.g., NL question 505) are associated with the same database schema (e.g., database schema 510). The second approach (cross schema ICL) is intended for use in ICL where examples in the one or more memory banks 520 and the given query (e.g., NL question 505) are not associated with the same database schema (e.g., database schema 510).

Common Schema ICL

In the common schema ICL approach, the finalized prompt describes a single common schema, leaving more space in the prompt to accommodate more demonstrations. The techniques utilized for this approach include collecting demonstrations (<textual NL query, SQL pairs>) at runtime (e.g., in a continuous manner), post deployment at the customer or user site. In many customer or user applications, it is possible to obtain direct feedback from the end user, either implicitly when the user-workflow leads to a successful completion, or explicitly when the end user is posed a question such as "are you satisfied with our response on this visit" to which the end user can response with a thumbs-up or thumbs-down. Such successful customer journeys can then be post-processed and the corresponding <text, sql>pairs in that session can be added into the memory bank. The use of the feedback mechanism can ensure that the demonstrations collected are of a high quality (i.e., most accurate transformation of NL to SQL and/or result obtained using the SQL). Thus, the memory bank can grow into a large collection of diverse high-quality examples that would offer highly similar demonstrations to much of the future test or production examples.

In some instances, a vector-database with a similarity search index, can serve as the one or more memory banks, which can easily scale from a few thousands of demonstrations and beyond. A vector database with a similarity search index, such as one built using Faiss (Facebook AI Similarity Search), is designed to efficiently store, manage, and retrieve high-dimensional vector representations of data points, which may or may not be derived from machine learning models. At its core, the architecture is comprised of two primary components: the storage layer for vector embeddings and the similarity search index. The vector embeddings are numeric representations of data (e.g., text, images, or audio such as the NL utterances in the <text, sql>pairs) that encode their semantic or contextual meaning in a continuous, high-dimensional space. These embeddings are stored in the database, often alongside metadata for contextual reference. The similarity search index, such as the ones provided by Faiss, is responsible for enabling fast and efficient retrieval of vectors that are most similar to a given query vector (referred to as the "key"). This index uses algorithms like approximate nearest neighbor (ANN) search to scale searches across thousands or millions or even billions of vectors. ANN techniques, such as locality-sensitive hashing (LSH), hierarchical clustering (e.g., HNSW), or product quantization (PQ), reduce the complexity of searching by organizing the vector space into partitions or compressed representations, allowing for rapid comparisons. When a query vector (key) is provided, the system calculates similarity scores, typically using metrics like cosine similarity or Euclidean distance, to determine how "close" the query vector is to others in the space. The database then retrieves and returns the top-k most similar vectors, often with their associated metadata, enabling applications such as use by the SQL agent system for translating NL to SQL. This architecture is highly optimized for scalability and speed, making it ideal for real-time or large-scale machine learning-driven search tasks.

In the common schema ICL approach, the one or more memory banks are indexed on the NL utterance (e.g., question) and the techniques utilized for this approach further include querying or searching the one or more memory banks using the test or production example's NL utterance as the key to retrieve the top-N most similar examples. Further, a threshold T may be specified to discard any candidate examples from consideration and/or the one or more memory banks whose score with the test or production utterance is less than T. That is, a score for each candidate C in the one or more memory banks can be computed, for example, as the cosine similarity between C's NL query and the test or production example's NL utterance. For example, consider the test NL query: "Fetch all payments for vision operations in the last 10 days" from schema="fusion", the Expected or Gold SQL (ground truth) is: "SELECT*FROM paymentDetail_view_payablesPayment WHERE organizationUnit.name='Vision Operations' AND paymentDate BETWEEN TRUNC (SYSDATE)−10 AND SYSDATE". Now consider the two candidates in the memory bank shown in Table 4. As shown, based on the common schema ICL approach, Example A ranks higher on the similarity score than Example B, as Example A shares the word "payments" and " . . . in the last X days/months" with the test query.

TABLE 4

| Candidate Id | Natural Language (NL) query | Schema | SQL statement | Cosine Similarity score between candidate's NL query and test NL query. |
|---|---|---|---|---|
| A | "list all payments for MRIs in the last 21 days" | "fusion" | "SELECT * FROM paymentDetail_view _payablesPayment WHERE organizationUnit.name = 'MRI' AND paymentDate BETWEEN TRUNC(SYSDATE) - 21 AND SYSDATE; | 0.95 |

TABLE 4-continued

| Candidate Id | Natural Language (NL) query | Schema | SQL statement | Cosine Similarity score between candidate's NL query and test NL query. |
|---|---|---|---|---|
| B | "identify patients who had appointments in the last two months" | "fusion" | select * from patient appointments where date_moved between trunc(sysdate-60) and sysdate | 0.64 |

Cross Schema ICL

While the above approach works well for common schema ICL, it does not work well in the cross-schema setting. In cross schema ICL, the examples in the one or more memory banks may belong to different schemas and further the test or production example may be from an unseen schema (e.g., in the cold start scenario). Text-similarity is problematic in the cross-schema setting as table-names, column-names have an undue influence. The problem is illustrated continuing with the above example. Consider again the test NL query: "Fetch all payments for vision operations in the last 10 days" from schema="fusion", the Expected or Gold SQL (ground truth) is: "SELECT*FROM paymentDetail_view_payablesPayment WHERE organizationUnit.name='Vision Operations' AND paymentDate BETWEEN TRUNC (SYSDATE)−10 AND SYSDATE". Now consider the two candidates in the memory bank shown in Table 5.

TABLE 5

| Candidate Id | Natural Language (NL) query | Schema | SQL statement | Cosine Similarity score between candidate's NL query and test NL query. |
|---|---|---|---|---|
| A | "list the payments made by advertising" | "marketing" | select * from payments where deparment=" marketing"; | 0.84 |
| B | "identify residents who moved into their current property last two month" | "housing" | select * from residents where date_moved between trunc(sysdate-60) and sysdate | 0.72 |

As shown, based on the common schema ICL approach, Example A ranks higher on the similarity score than Example B, as Example A shares the word "payments" with the test query. However, Example A is a worse demonstration and Example B happens to be a more relevant demonstration for this test query. This is because, B's SQL structure is more closely related to the test-example's gold-SQL structure (see the SQL portion " . . . where date_moved between (sysdate-30) and sysdate"). With the cross schema ICL (using pattern matching for the key and index), Example B would rank higher, as it matches the common phrase " . . . in the last X days/months" with the test example.

In cross schema ICL, the NL queries are transformed into category specific patterns. Follows is description of embodiments with particularity to transformation of NL queries into the category of "date-time examples"; however, it should be understood that the NL queries can be transformed into any category specific patterns. The input NL question is transformed by extracting the subphrase in it that relates to date-time patterns such as "in last May", "since last 3 quarters", "after next October" . . . etc. A generative artificial intelligence model such as an LLM (e.g., LLama-70b) can be used for this transformation (see example Prompt for Pattern Extraction for date-time phrase extraction provided below). For examples in the one or more memory bank, this pattern may be extracted and included as an additional record in the one or more memory banks as illustrated below in Table 6.

TABLE 6

| Candidate Id | NL query | Pattern | SQL Statement | Schema |
|---|---|---|---|---|
| 1 | "List students who joined last April" | "last April" | select * from students where to_char("mm", admission_date) >= "04" and . . . | Schema=Students: Create Table Students( student_id integer, admission_date |

TABLE 6-continued

| Candidate Id | NL query | Pattern | SQL Statement | Schema |
|---|---|---|---|---|
| | | | | datetime, ..) |
| 2 | "find products sold in the first quarter" | "in the first quarter" | select * from sales where to_char("Q", sale_date)=="01" | Schema=Marketing: Create Table Sales ( selling_price integer, region varchar, sale_date datetime, . . .) |
| 3 | . . . | | . . . | . . . |

Prompt for Pattern Extraction:

Given a sentence, print out the phrase in it that relates to time periods. Output only the relevant phrase and no other explanation.

If there is no relevant phrase, output an empty string. Replace all numbers with NN.

Here are some examples:

Input: "Fetch all payments for vision operations in the previous month"

Output: "in the previous month"

Input: "What is the total number of movies directed by Ben"

Output: " "

Input: "In the last 10 months what was the total expenditure."

Output: "In the last NN months"

Now your turn:

Input: "{question}"

Output: """

During test or production phase, the top-N demonstrations may be retrieved from the one or more memory bank whose score >=threshold T as before, but the score computation is modified as described below:

Key=Pattern, Value=Pattern:

In this approach, the pattern is extracted from the test or production example and the candidate scoring function is computed (e.g., as cosine_similarity (Test example's Pattern, Candidate examples' Pattern)). The disadvantage of this approach is an additional call to the generative artificial intelligence model to extract the pattern from the test or production, which will increase the test or inference time latency, but the advantage is that it offers a higher performance.

Key=Question, Value=Pattern:

In this approach, the test or production example is not processed for extraction of the pattern and instead the candidate scoring function is computed (e.g., as cosine_similarity (Test example's NL query, Candidate examples' Pattern)). The advantage of this approach is that there is no impact on test or inference time latency, but the disadvantage is the reduced performance boost obtained with this approach.

As described above, retrieving demonstrations from a memory bank may be performed by using a vector database such as Faiss, OpenSearch, or Pinecone. The main data items or records in the memory bank are the demonstrations which may be stored as a JSON record such as "{schema: , natural-language-query: , sql: .."}. Additionally, the vector database allows one or more vectors of real numbers to be associated with each record. In certain embodiments, a text embedder such as Snowflake can be used to produce text-embeddings, for the natural-language-query and the pattern phrases in the record. For example, the text "Fetch me all payments made last year" when input to a text embedder may generate a 128-dimensional vector of real numbers. Similarly, the pattern "last year" can also be fed to the text embedder, which generates a similar 128-dimensional vector. When new data or records are being added to the vector database, the text embeddings may be generated for each new data or record. Further, the vector database may be used to construct highly efficient indexes over the text embedding vectors associated with each record. Next, when a test or production query is received with a new string such as "Fetch receipts from last year", initially a text embedding (Q) is generated associated with this query. The vector database, then computes a similarity score between Q and the vector representation of each of the records' Natural-language-query field and returns the topmost-K records with the highest similarity score. The vector database can also be set up to compute a similarity score between Q and the vector representation of each of the records' Pattern field and similarly return the topmost-K records with the highest similarity score.

A sample prompt illustrating the few-shot Text-to-SQL task (using the cross schema approach) is shown below.

Given an input Question, create a syntactically correct Oracle SQL query to run.

Pay attention to using only the column names that you can see in the schema description. Be careful to not query for columns that do not exist. Also, pay attention to which column is in which table.

Please double check the Oracle SQL query you generate.

DO NOT use alias in the SELECT clauses.

Only use the tables listed in the provided schema.

You can refer to the following In-Context Examples:

Question: List all the payment which are done on last Friday

```
Schema:
create table payment (
  payment__id number not null, customer__id number, staff__id number,
  rental__id number, amount number(5, 2),
  payment__date timestamp, last__update timestamp,
```

-continued

```
   constraint payment__id__pk__12 primary key (payment__id),
   constraint customer__id__fk__13 foreign key(customer__id) references customer (customer__id),
   constraint rental__id__fk__14 foreign key(rental__id) references rental (rental__id),
   constraint staff__id__fk__12 foreign key(staff__id) references staff (staff__id)
)
/*
3 rows from payment table:
payment__id customer__id staff__id rental__id amount payment__date last__update
*/
Oracle SQL: "SELECT * FROM Payment WHERE TO__CHAR(payment__date, 'D') = '6' AND
TO__CHAR(payment__date, 'YYYY-IW') = TO__CHAR(SYSDATE
- interval '7' day, 'YYYY-IW')"
Question: List all the payment which are done on last Friday
Schema:
create table payment (
   payment__id number not null, customer__id number, staff__id number,
   rental__id number, amount number(5, 2),
   payment__date timestamp, last__update timestamp,
   constraint payment__id__pk__12 primary key (payment__id),
   constraint customer__id__fk__13 foreign key(customer__id) references customer (customer__id),
   constraint rental__id__fk__14 foreign key(rental__id) references rental (rental__id),
   constraint staff__id__fk__12 foreign key(staff__id) references staff (staff__id)
)
/*
3 rows from payment table:
payment__id customer__id staff__id rental__id amount payment__date last__update
*/
Oracle SQL: "SELECT * FROM Payment WHERE TO__CHAR(payment__date, 'D') = '5' AND
TO__CHAR(payment__date, 'YYYY-IW') = TO__CHAR(SYSDATE
- interval '7' day, 'YYYY-IW')"
Question: show all good customer payments which happened in or before this June
Thought: I might use Customers.customer__status__code for "good customer"
Schema:
   create table customers (
   customer__id integer not null, customer__address__id integer,
   customer__status__code varchar(4000 char), date__became__customer timestamp, date__of__birth
   timestamp,
   first__name varchar(4000 char), last__name varchar(4000 char), amount__outstanding
   binary__double, email__address varchar(4000 char), phone__number varchar(4000 char),
   cell__mobile__phone__number varchar(4000 char), constraint customer__id__pk__3 primary key
   (customer__id),
   constraint customer__address__id__fk__1 foreign key(customer__address__id) references
   addresses (address__id)
)
/*
3 rows from customers table:
customer__id customer__address__id customer__status__code date__became__customer date__of__birth
first__name last__name amount__outstanding email__address phone__number
cell__mobile__phone__number
1 13 bad customer 2016-05-11 17:03:48 1998-12-15 13:24:40 carole bernhard 255.0
"everette.goyette@example.org" 07278206718 86
1-638-9797
2 10 bad customer 2015-11-16 22:52:14 1995-07-17 12:13:16 genevieve terry 7256.0
"huel.jana@example.org" +14(5)
2351480248 578-518-4785x612
3 10 good customer 2016-04-08 00:28:15 1994-06-21 01:34:56 clara ortiz 9443.0
"hilario.sporer@example.org" 374-483-2758x85087 1- 197-686-2849x8761
*/
create table customer__payments ( customer__id integer not null, datetime__payment timestamp not
null, payment__method__code varchar(4000 char), amount__payment binary__double,
constraint customer__id__datetime__payment__pk__4 primary key (customer__id, datetime__payment),
constraint customer__id__fk__2 foreign key(customer__id) references customers (customer__id)
)
/*
3 rows from customer__payments table:
customer__id datetime__payment payment__method__code amount__payment
11 2018-02-05 18:44:46 direct debit 9570.93
2 2018-02-24 10:07:05 direct debit 8180.26
14 2018-02-27 20:08:53 direct debit 4610.26
```

-continued

```
*/
Oracle SQL: "SELECT * FROM Customer__Payments T1 JOIN Customers T2 ON
T1.customer__id = T2.customer__id WHERE (EXTRACT(MONTH FROM
T1.datetime__payment) <= 6 AND EXTRACT(YEAR FROM T1.datetime__payment) =
EXTRACT(YEAR FROM SYSDATE) OR EXTRACT(YEAR FROM T1.datetime__payment) <
EXTRACT(YEAR FROM SYSDATE)) AND T2.customer__status__code = 'good customer'"
```

**************

Please answer the below question with Oracle SQL statement only and nothing else.

Generate only Oracle SQL statement and nothing else.

Question: Fetch all payments for vision operations in the last 30 days

```
Schema: CREATE TABLE paymentDetail__view__payablesPayment (
  paymentId VARCHAR(255),
  paymentStatusLookupCode
  ENUM('NEGOTIABLE','RECONCILED','OVERFLOW','RECONCILED
  UNACCOUNTED','CLEARED BUT UNACCOUNTED','STOP
  INITIATED','ISSUED','SET UP','VOIDED','SPOILED','UNCONFIRMEDSET
  UP','CLEARED') NOT NULL,
  futurePayDueDate DATE NOT NULL, paymentDate DATE, paymentAmount
  VARCHAR(255),
  paymentBaseAmount VARCHAR(255) NOT NULL, paymentNumber VARCHAR(255),
  actualValueDate DATE NOT NULL, anticipatedValueDate DATE NOT NULL, updatedBy
  VARCHAR(255),
  timeUpdated VARCHAR(255), createdBy VARCHAR(255), timeCreated
  VARCHAR(255),
  addressLine1 VARCHAR(255) NOT NULL, addressLine2 VARCHAR(255) NOT NULL,
  addressLine3 VARCHAR(255) NOT NULL, addressLine4 VARCHAR(255) NOT NULL,
  addressStyle VARCHAR(255) NOT NULL, bankChargeBearer VARCHAR(255) NOT
  NULL, checkVoucherNumber VARCHAR(255) NOT NULL, checkrunName
  VARCHAR(255) NOT NULL,
  city VARCHAR(255) NOT NULL,
  clearingAmount VARCHAR(255) NOT NULL, clearingBaseAmount VARCHAR(255)
  NOT NULL, clearingChargesAmount VARCHAR(255) NOT NULL,
  clearingChargesBaseAmount VARCHAR(255) NOT NULL, clearingDate DATE NOT
  NULL,
  clearingErrorAmount VARCHAR(255) NOT NULL, clearingErrorBaseAmount
  VARCHAR(255) NOT NULL, clearingConversionDate DATE NOT NULL,
  clearingConversionRate VARCHAR(255) NOT NULL, country VARCHAR(255) NOT
  NULL,
  county VARCHAR(255) NOT NULL,
  paymentCurrencyCode VARCHAR(255), description VARCHAR(255) NOT NULL,
  documentCategoryCode VARCHAR(255) NOT NULL, documentSequenceValue
  VARCHAR(255) NOT NULL, employeeAddressCode VARCHAR(255) NOT NULL,
  conversionDate DATE NOT NULL,
  conversionRate VARCHAR(255) NOT NULL, logicalGroupReference VARCHAR(255)
  NOT NULL, maturityConversionDate DATE NOT NULL, maturityConversionRate
  VARCHAR(255) NOT NULL, paymentTypeLookupCode ENUM('N','Q','R','M','A'),
  positivePayStatusCode VARCHAR(255) NOT NULL, province VARCHAR(255) NOT
  NULL,
  reconciledFlag BOOLEAN NOT NULL, releasedBy VARCHAR(255) NOT NULL,
  releasedDate DATE NOT NULL,
  remitToAddressName VARCHAR(255) NOT NULL, remitToSupplierName
  VARCHAR(255) NOT NULL, state VARCHAR(255) NOT NULL,
  stoppedBy VARCHAR(255) NOT NULL,
  stopDate DATE NOT NULL,
  transferPriority VARCHAR(255) NOT NULL, treasuryPayDate DATE NOT NULL,
  treasuryPayNumber VARCHAR(255) NOT NULL, voidDate DATE NOT NULL,
  crossCurrencyRateType VARCHAR(255) NOT NULL, zip VARCHAR(255) NOT NULL,
  bankAccountName VARCHAR(255), bankAccountUse.id VARCHAR(255),
  bankAccountUse.bankAccount.id VARCHAR(255), bankAccountUse.bankAccount.name
  VARCHAR(255),
  bankAccountUse.bankAccount.endDate DATE NOT NULL,
  bankAccountUse.bankAccount.targetBalance VARCHAR(255) NOT NULL,
  bankAccountUse.bankAccount.currencyCode VARCHAR(255) NOT NULL,
  bankAccountUse.bankAccount.bankExchangeRateType VARCHAR(255) NOT NULL,
  bankAccountUse.bankAccount.bank.id VARCHAR(255),
  bankAccountUse.bankAccount.bank.name VARCHAR(255),
  bankAccountUse.bankAccount.bankBranch.id VARCHAR(255),
  bankAccountUse.bankAccount.bankBranch.name VARCHAR(255),
  supplier.supplierId VARCHAR(255), supplier.taxOrganizationType VARCHAR(255) NOT
  NULL,
  supplier.businessRelationshipCode
  ENUM('NONE','SPEND__AUTHORIZED','PROSPECTIVE') NOT NULL, supplier.type
  VARCHAR(255),
  supplier.supplierNumber VARCHAR(255), supplier.name VARCHAR(255),
```

-continued

```
supplier.registryId VARCHAR(255), supplier.id VARCHAR(255), supplier.alias.id
VARCHAR(255),
supplier.alias.name VARCHAR(255) NOT NULL, supplierSite.id VARCHAR(255),
supplierSite.name VARCHAR(255), systemOption.businessUnitId VARCHAR(255),
systemOption.ledger.ledgerId VARCHAR(255), systemOption.ledger.name
VARCHAR(255),
systemOption.ledger.currency.currencyCode VARCHAR(255),
systemOption.ledger.currency.precision INT NOT NULL, legalEntity.legalEntityId
VARCHAR(255),
legalEntity.name VARCHAR(255), legalEntity.legalEntityIdentifier VARCHAR(255),
organizationUnit.id VARCHAR(255), organizationUnit.effectiveStartDate DATE,
organizationUnit.effectiveEndDate DATE, organizationUnit.name VARCHAR(255),
externalBankAccount.maskedAccountNumber VARCHAR(255) NOT NULL,
externalBankAccount.maskedIban VARCHAR(255) NOT NULL, externalBankAccount.id
VARCHAR(255), erpSettlementPriorityLookup.lookupType VARCHAR(255),
erpSettlementPriorityLookup.meaning VARCHAR(255),
erpSettlementPriorityLookup.lookupCode VARCHAR(255), paymentMethodLookup.code
VARCHAR(255), paymentMethodLookup.paymentMethodName VARCHAR(255),
paymentMaturityConversionRateType.conversionRateType VARCHAR(255),
paymentClearingConversionRateType.conversionRateType VARCHAR(255)
)
```

Description of the important columns of the table schema defined above:

'payment process request' means the current system or schema not a specific table, column, or value. paymentTypeLookupCode is used to look up payment codes.

Always use paymentTypeLookupCode='A' if the payments was already made or processed or paid, or done.

'open balance' means paymentStatusLookupCode IN ('N','P')

supplier.supplierId is the id of a supplier in an invoice. Pay attention to check for this column if the question is about 'non supplier' invoice or 'supplier' invoice. For example:

'non supplier' means that supplier.supplierId='null'.

'non supplier invoice' means that supplier.supplierId='null'.

'all supplier' means that supplier.supplierId!='null'.

'all supplier invoice' means that supplier.supplierId!='null'. paymentStatusLookupCode is the column used status of the payments.

'pending payments' mean paymentStatusLookupCode!='CLEARED'.

'uncleared payments' mean paymentStatusLookupCode!='CLEARED'. paymentDate is the column used when the payment was done. paymentCurrencyCode is used to know the currency in which the payment was done.

Besides below descriptions on column for names, please also pay attention more to columns ###Context and In-Context Examples sections when checking for name values.

organizationUnit.name is used for the name of the organization unit.

bankAccountName is the name of the bank account from which the payment originates.

bankAccountUse.bankAccount fields are for the destination bank account to which the payment is made.

bankAccountUse.bankAccount.name is the name of the destination bank account.

bankAccountUse.bankAccount.bank.name is the name of the destination bank account. Use this column only for the bank name when the branch name is also mentioned separately.

bankAccountUse.bankAccount.bankBranch.name is the branch name of the destination bank account.

systemOption.ledger.name is used for the name of the ledger.

legalEntity.name is the name of the legal entity.

supplier.name is the name of the supplier.

supplierSite.name is the site, location, or city of the supplier.

Context:

'Vision Operations' is an organizationUnit.name.

Figure 6:
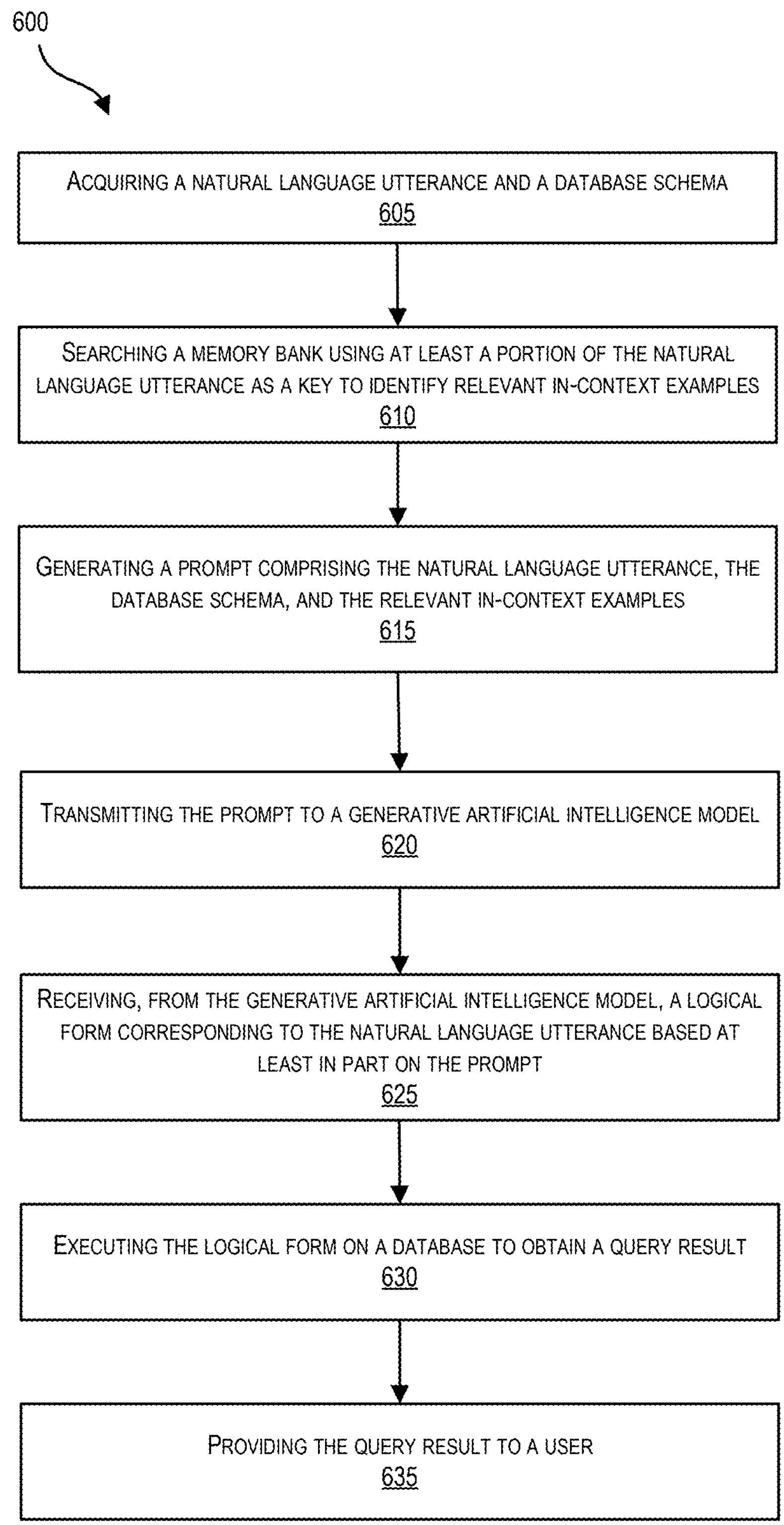
FIG. 6 is a flowchart illustrating a process for in-context learning of a generative artificial intelligence model for the task of transforming or translating natural language utterances into a logic form such as NL2SQL, according to various embodiments.

Oracle SQL:

FIG. 6 is a flowchart illustrating a process 600 for in-context learning of a generative artificial intelligence model for the task of transforming or translating natural language utterances into a logic form such as NL2SQL, according to various embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIGS. 1-5, the processing depicted in FIG. 6 may be performed by an agent system (e.g., SQL agent system 200 described with respect to FIG. 2).

At step 605, a natural language utterance and a database schema are acquired. For example, a natural language utterance and the database schema can be acquired during a conversation between a user and a digital assistant (e.g., provided by a user). Additionally or alternatively, a natural language utterance can be received during a conversation between a user and a digital assistant, and a database schema can be obtained for a corresponding database. Obtaining the database schema may comprise determining a database associated with the natural language utterance (e.g., a database referenced directly or indirectly by the natural language utterance). The database may be determined based on the natural language utterance (e.g., provided by the user as part of the conversation with the digital assistant), an application in which the natural language utterances was received (e.g., the application is linked with one or more particular databases), the digital assistant being used for the conversation (e.g., the digital assistant determined the most relevant one or more databases), an express indication by the user that is separate from the natural language utterance (e.g., the user selected the database, which triggered the conversation with the digital assistant), a user interface selection (e.g., selecting the database in a UI element such as a drop down box), or any combination thereof.

At step 610, a memory bank is searched, using at least a portion of the natural language utterance as a key, for one or more in-context examples that are relevant to the key. The memory bank comprises in-context examples, and each of the in-context examples comprises an illustrative natural language utterance, an illustrative logical form corresponding to the illustrative natural language utterance, and an illustrative database schema.

In some instances, the memory bank is pre-populated with examples belonging to that of the database schema. In other instances, the memory bank does not have examples belonging to that of the database schema (instead the memory bank is pre-populated with examples belonging to one or more other database schemas). In certain instances, prepopulating the memory bank with examples belonging to that of the database schema and/or the one or more other database schemas comprises collecting the examples continuously at runtime, post deployment of a generative artificial intelligence model (e.g., a first pretrained generative artificial intelligence model such as NL2SQL Model 406 such as an LLM described with respect to FIG. 4).

In some instances, the searching comprises: determining a similarity score as a metric of similarity between the key and the illustrative natural language utterance corresponding to each of the in-context examples, comparing the similarity scores to a predetermined threshold, and identifying one or more in-context examples having a similarity score greater than or equal to the predetermined threshold as the one or more in-context examples that are relevant to the key.

In other instances, prior to performing the search, the natural language utterance is transmitted to a generative artificial intelligence model (e.g., a second pretrained generative artificial intelligence model). A natural language text pattern may be generated by the generative artificial intelligence model based at least in part on the natural language utterance. The natural language text pattern may be received from the generative artificial intelligence model. The natural language text pattern comprises a portion of the natural language utterance, each of the in-context examples comprises an illustrative natural language utterance, an illustrative natural language text pattern corresponding to the illustrative natural language utterance, an illustrative logical form corresponding to the illustrative natural language utterance, and an illustrative database schema, and the memory bank is searched for the one or more in-context examples that are relevant to the key using the natural language text pattern as the key. The searching comprises: determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

In yet other instances, each of the in-context examples comprises an illustrative natural language utterance, an illustrative natural language text pattern corresponding to the illustrative natural language utterance, an illustrative logical form corresponding to the illustrative natural language utterance, and an illustrative database schema. In such instances, the searching comprises: determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

At step 615, a prompt comprising the natural language query, the database schema, and the one or more in-context examples is generated.

At step 620, the prompt is transmitted to a generative artificial intelligence model (e.g., a first pretrained generative artificial intelligence model such as NL2SQL Model 406 such as an LLM described with respect to FIG. 4).

At step 625, a logical form corresponding to the natural language utterance is received from the generative artificial intelligence model based at least in part on the prompt. For example, the prompt may be input into a generative artificial intelligence model, the generative artificial intelligence model may generate a logical form (e.g., an SQL statement) corresponding to the natural language utterance, and the generative artificial intelligence model may output the logical form (e.g., transmit the logical form to the SQL agent or a separate component such as an execution engine for execution on a database or system)).

At step 630, the logical form is executed on a database to obtain a query result. For example, an execution engine (e.g., a SQL execution 224 tool that is configured to execute SQL queries on the database 226 as described with respect to FIG. 2) may execute a query on a database using the logical form.

At step 635, the query result is provided to a user. For example, the execution engine can obtain the query result from the database and forward said query result to the user. Alternatively, the execution engine can obtain the query result from the database and forward said query result to the SQL agent. The SQL agent may then forward said query result to the user or further process the query result and provide the query result as part of a natural language conversation with the user (e.g., incorporate the query result into a conversation with the user and/or generate analytics or visuals concerning the query result and provide said analytics, visual, query result, or any combination thereof to the user as part of the conversation).

In some instances, the process 600 further comprises receiving positive feedback from the user concerning the query result (e.g., a thumbs-up or positive sentiment to the SQL agent on the query result), and responsive to receiving the positive feedback, storing the natural language utterance, the database schema, and the logical form corresponding to the natural language utterance as an additional in-context example within the memory bank.

In some instance, the process 600 further comprises determining whether the common schema ICL or cross schema ICL approach should be used and processing the natural language utterance based on said determined approach. For example, in certain instances, the process 600 further comprises: (i) comparing the database schema to the illustrative database schemas of the in-context examples, (ii) determining, based on the comparing, the database schema is not the same as any of the illustrative database schemas (cross schema), (iii) responsive to determining the database schema is not the same as any of the illustrative database schemas, transmitting the natural language utterance to a generative artificial intelligence model (e.g., a second pre-trained generative artificial intelligence model), and (iv) receiving, from the generative artificial intelligence model, a natural language text pattern based at least in part on the natural language utterance. The natural language text pattern comprises a portion of the natural language utterance, each of the in-context examples comprises an illustrative natural language utterance, an illustrative natural language text pattern corresponding to the illustrative natural language utterance, an illustrative logical form corresponding to the illustrative natural language utterance, and an illustrative database schema, and the memory bank is searched for the one or more in-context examples that are relevant to the key using the natural language text pattern as the key. The searching comprises determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

In other instances, the process 600 further comprises: (i) comparing the database schema to the illustrative database schemas of the in-context examples, and (ii) determining, based on the comparing, the database schema is the same as one or more of the illustrative database schemas. Responsive to determining the database schema is the same as one or more of the illustrative database schemas, the memory bank is searched for the one or more in-context examples that have an illustrative database schema that is the same as the database schema and are relevant to the key using the natural language text pattern as the key. The searching comprises determining a similarity score as a metric of similarity between the key and the illustrative natural language utterance corresponding to each of the in-context examples, comparing the similarity scores to a predetermined threshold, and identifying one or more in-context examples having a similarity score greater than or equal to the predetermined threshold as the one or more in-context examples that are relevant to the key As used herein, the terms "about," "similarly," "substantially," and "approximately" are defined as being largely but not necessarily wholly what is specified (and include wholly what is specified) as understood by one of ordinary skill in the art. In any disclosed embodiment, the term "about," "similarly," "substantially," or "approximately" may be substituted with "within [a percentage] of" what is specified, where the percentage includes 0.1 percent, 1 percent, 5 percent, and 10 percent, etc.

As used herein, when an action is "based on" something, this means the action can be based at least in part on at least a part of the something.

Illustrative Systems

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
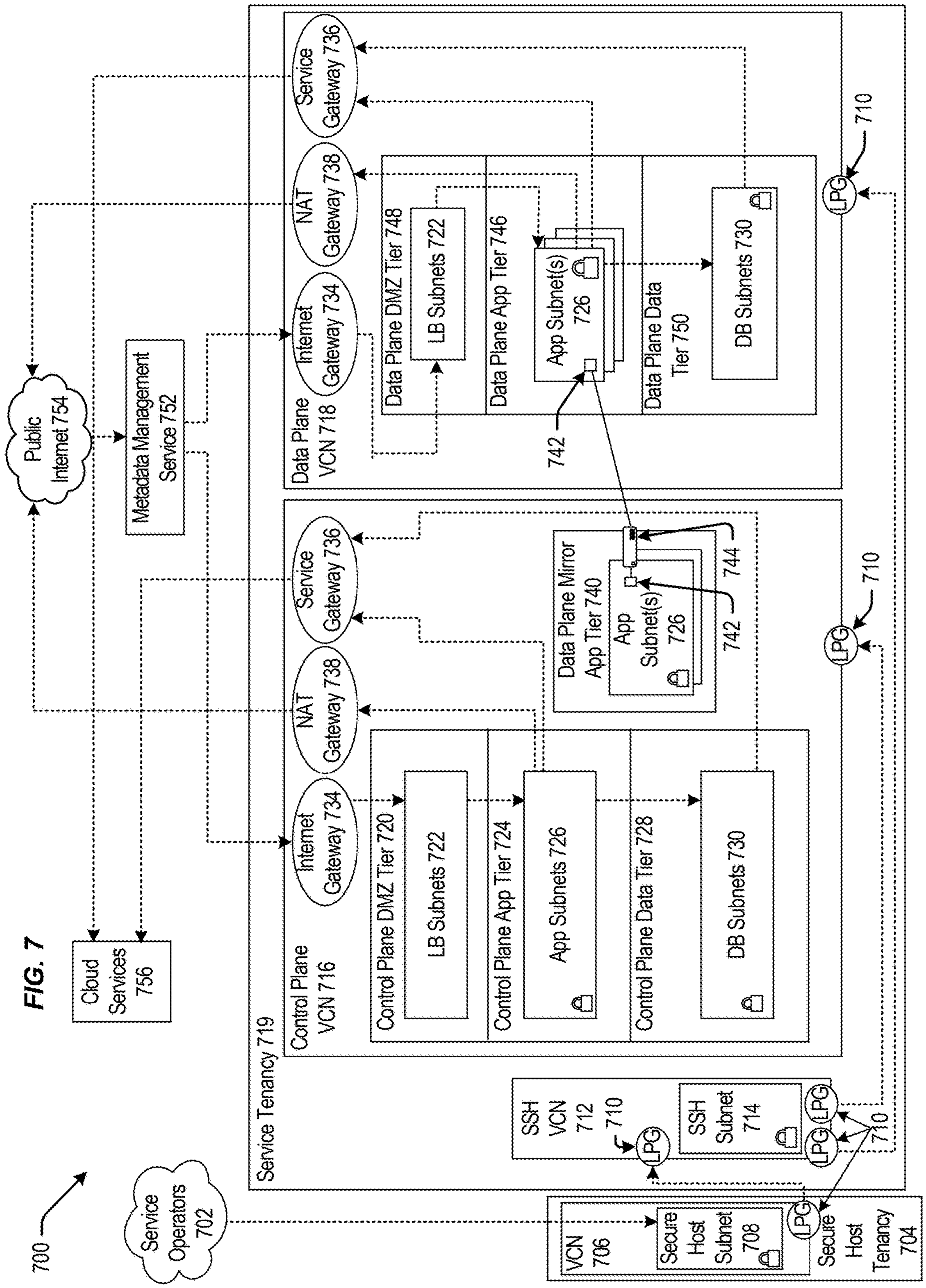
FIG. 7 is a block diagram illustrating one pattern for implementing a cloud infrastructure as a service system, according to various embodiments.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively coupled to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
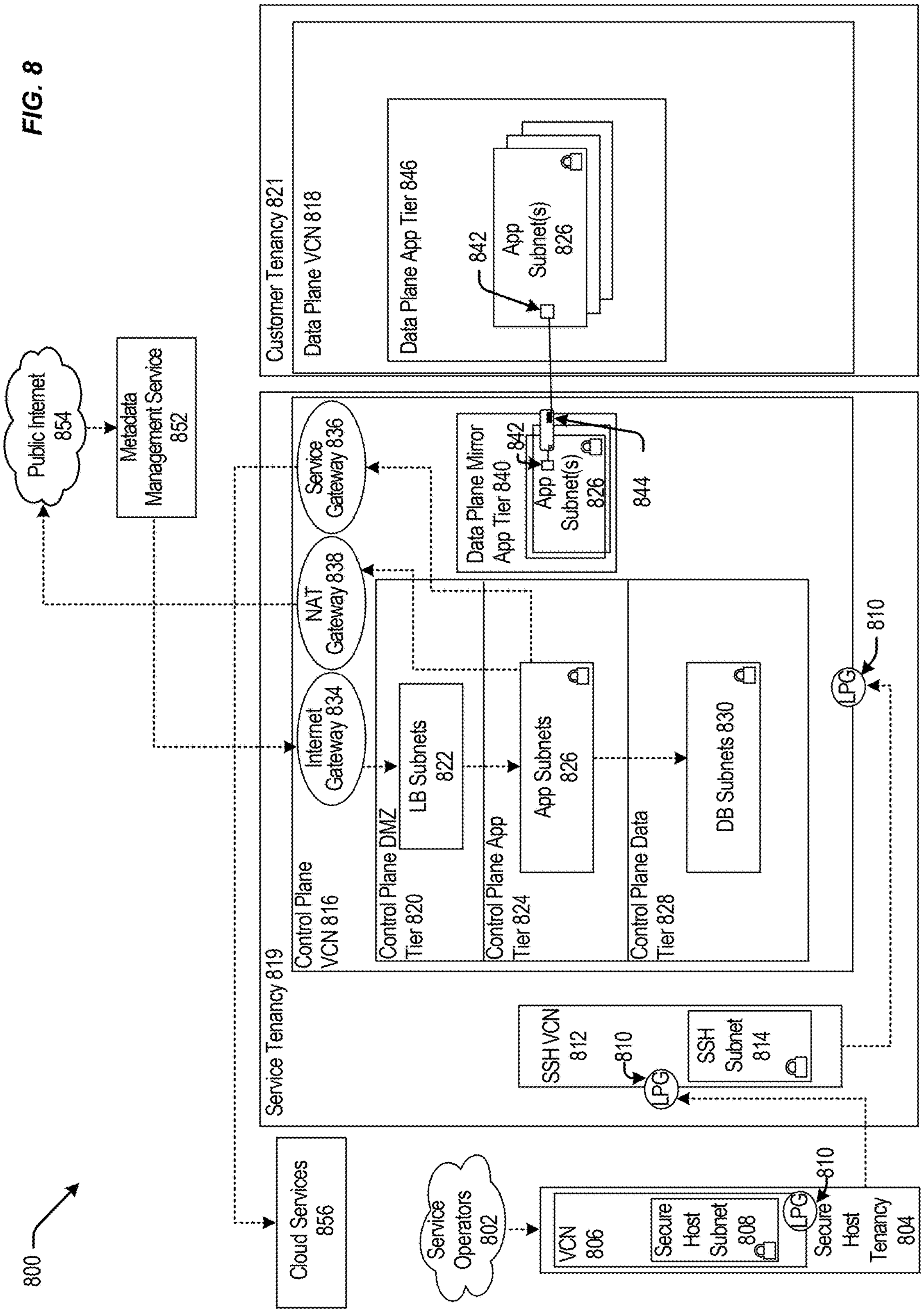
FIG. 8 is a block diagram illustrating another pattern for implementing a cloud infrastructure as a service system, according to various embodiments.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively coupled to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
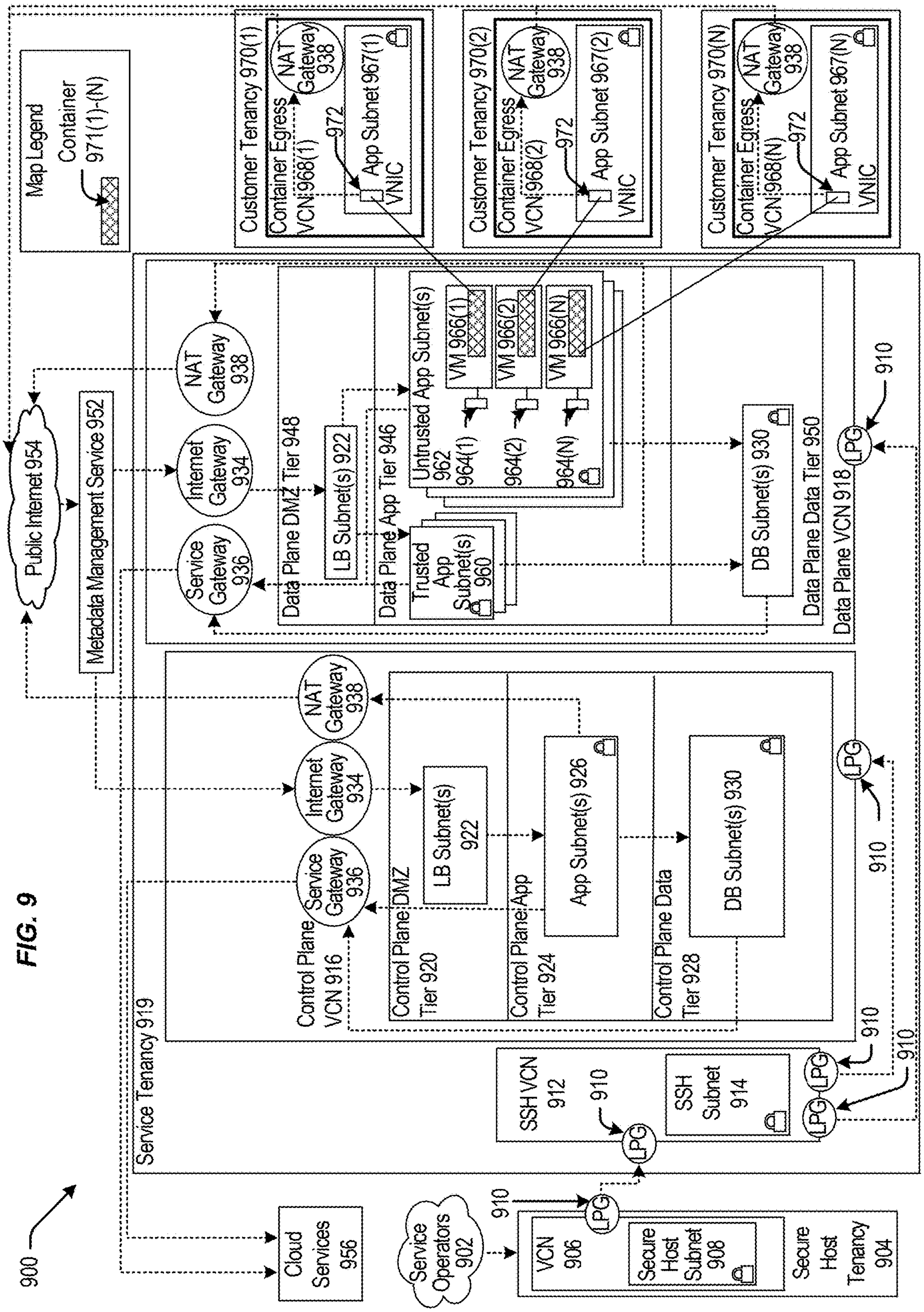
FIG. 9 is a block diagram illustrating another pattern for implementing a cloud infrastructure as a service system, according to various embodiments.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively coupled to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
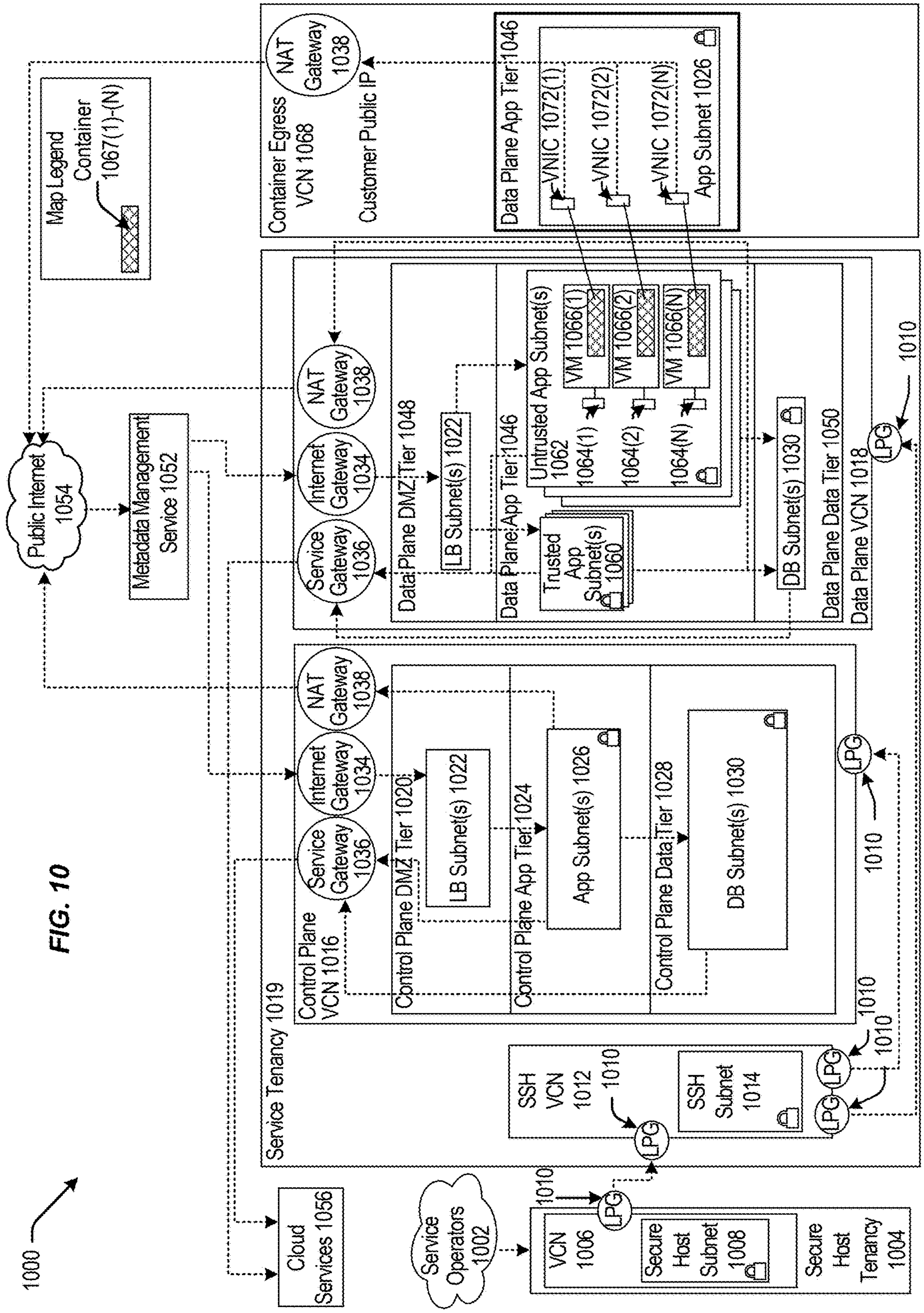
FIG. 10 is a block diagram illustrating another pattern for implementing a cloud infrastructure as a service system, according to various embodiments.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
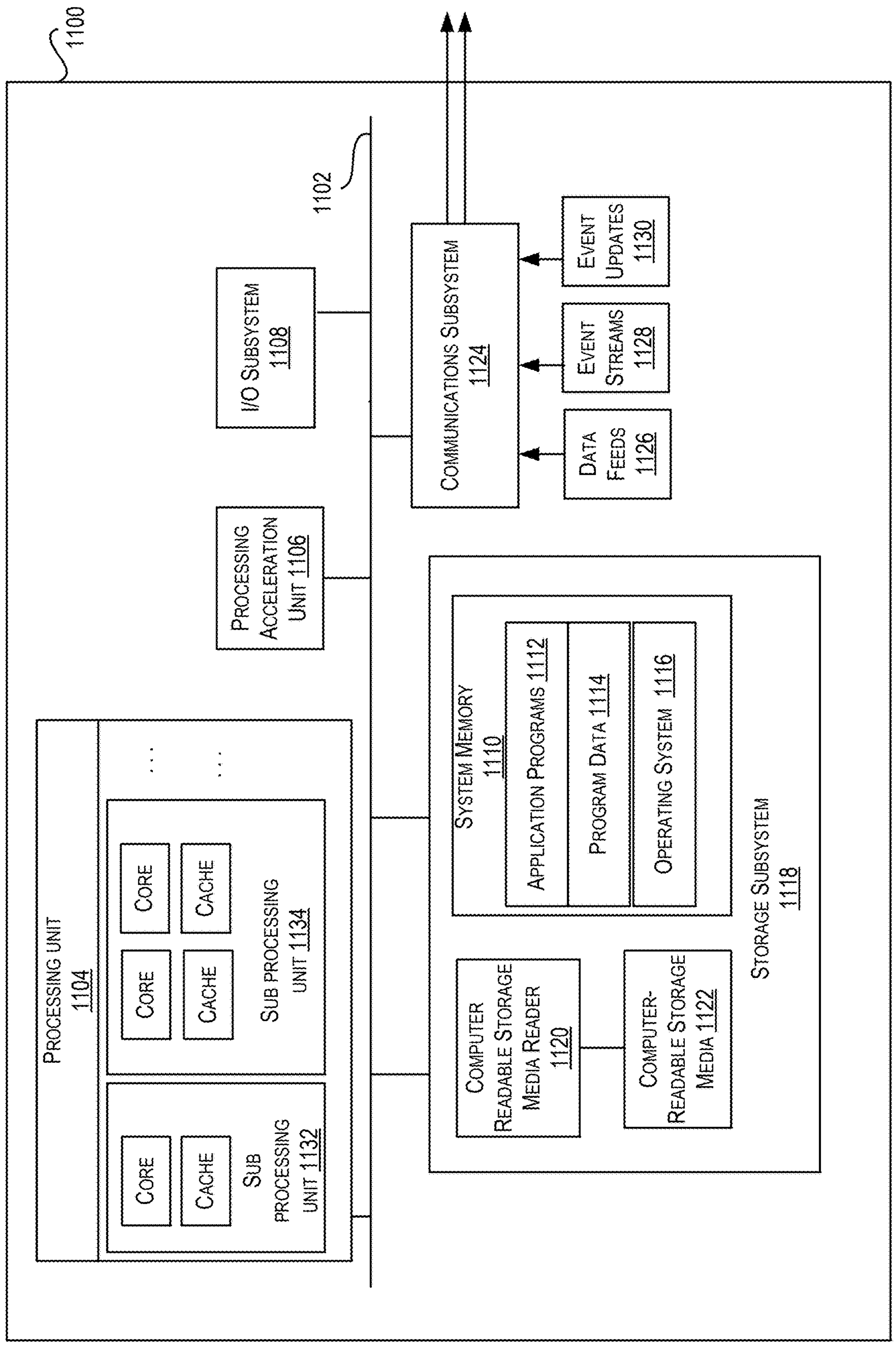
FIG. 11 is a block diagram illustrating an example computer system, according to various embodiments.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1104 provide the functionality described above. Storage subsystem 1118 may also provide a repository for storing data used in accordance with the present disclosure.

As depicted in the example in FIG. 11, storage subsystem 1118 can include various components including a system memory 1110, computer-readable storage media 1122, and a computer readable storage media reader 1120. System memory 1110 may store program instructions that are loadable and executable by processing unit 1104. System memory 1110 may also store data that is used during the execution of the instructions and/or data that is generated during the execution of the program instructions. Various different kinds of programs may be loaded into system memory 1110 including but not limited to client applications, Web browsers, mid-tier applications, relational database management systems (RDBMS), virtual machines, containers, etc.

System memory 1110 may also store an operating system 1116. Examples of operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1100 executes one or more virtual machines, the virtual machines along with their guest operating systems (GOSs) may be loaded into system memory 1110 and executed by one or more processors or cores of processing unit 1104.

System memory 1110 can come in different configurations depending upon the type of computer system 1100. For example, system memory 1110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1110 may include a basic input/output system (BIOS) containing basic routines that help to transfer information between elements within computer system 1100, such as during start-up.

Computer-readable storage media 1122 may represent remote, local, fixed, and/or removable storage devices plus storage media for temporarily and/or more permanently containing, storing, computer-readable information for use by computer system 1100 including instructions executable by processing unit 1104 of computer system 1100.

Computer-readable storage media 1122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1122 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Machine-readable instructions executable by one or more processors or cores of processing unit 1104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed:

1. A computer-implemented method comprising:

acquiring a natural language utterance and a database schema;

transmitting the natural language utterance to a generative artificial intelligence model;

receiving, from the generative artificial intelligence model, a natural language text pattern generated based on the natural language utterance;

searching, using the natural language text pattern as a key, a memory bank for one or more in-context examples that are relevant to the key, wherein the memory bank comprises in-context examples, and each of the in-context examples comprises an illustrative natural language utterance, an illustrative logical form corresponding to the illustrative natural language utterance, and an illustrative database schema;

generating a prompt comprising the natural language utterance, the database schema, and the one or more in-context examples;

transmitting the prompt to a pretrained generative artificial intelligence model;

receiving, from the pretrained generative artificial intelligence model, a logical form corresponding to the natural language utterance based at least in part on the prompt;

executing the logical form on a database to obtain a query result; and providing the query result to a user.

2. The computer-implemented method of claim 1, further comprising:

receiving positive feedback from the user concerning the query result; and responsive to receiving the positive feedback, storing the natural language utterance, the database schema, and the logical form corresponding to the natural language utterance as an additional in-context example within the memory bank.

3. The computer-implemented method of claim 1, wherein:

the natural language text pattern comprises a portion of the natural language utterance, each of the in-context examples comprises an illustrative natural language utterance, an illustrative natural language text pattern corresponding to the illustrative natural language utterance, an illustrative logical form corresponding to the illustrative natural language utterance, and an illustrative database schema, the memory bank is searched for the one or more in-context examples that are relevant to the key using the natural language text pattern as the key, and the searching comprises: determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

4. The computer-implemented method of claim 1, wherein:

each of the in-context examples comprises an illustrative natural language utterance, an illustrative natural language text pattern corresponding to the illustrative natural language utterance, an illustrative logical form corresponding to the illustrative natural language utterance, and an illustrative database schema, and the searching comprises: determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

5. The computer-implemented method of claim 1, wherein the searching comprises: determining a similarity score as a metric of similarity between the key and the illustrative natural language utterance corresponding to each of the in-context examples, comparing the similarity scores to a predetermined threshold, and identifying one or more in-context examples having a similarity score greater than or equal to the predetermined threshold as the one or more in-context examples that are relevant to the key.

6. The computer-implemented method of claim 1, further comprising:

comparing the database schema to the illustrative database schemas of the in-context examples;

determining, based on the comparing, the database schema is not the same as any of the illustrative database schemas; and responsive to determining the database schema is not the same as any of the illustrative database schemas, transmitting the natural language utterance to the pretrained generative artificial intelligence model, wherein:

the natural language text pattern comprises a portion of the natural language utterance, each of the in-context examples comprises an illustrative natural language utterance, an illustrative natural language text pattern corresponding to the illustrative natural language utterance, an illustrative logical form corresponding to the illustrative natural language utterance, and an illustrative database schema, the memory bank is searched for the one or more in-context examples that are relevant to the key using the natural language text pattern as the key, and the searching comprises: determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

7. A system comprising:

one or more processors; and one or more computer-readable media storing instructions which, when executed by the one or more processors, cause the system to perform operations comprising:

acquiring a natural language utterance and a database schema;

transmitting the natural language utterance to a generative artificial intelligence model;

receiving, from the generative artificial intelligence model, a natural language text pattern generated based at least in part on the natural language utterance;

searching, using the natural language text pattern as a key, a memory bank for one or more in-context examples that are relevant to the key, wherein the memory bank comprises in-context examples, and each of the in-context examples comprises an illustrative natural language utterance, an illustrative logical form corresponding to the illustrative natural language utterance, and an illustrative database schema;

generating a prompt comprising the natural language utterance, the database schema, and the one or more in-context examples;

transmitting the prompt to a pretrained generative artificial intelligence model;

receiving, from the pretrained generative artificial intelligence model, a logical form corresponding to the natural language utterance based at least in part on the prompt;

executing the logical form on a database to obtain a query result; and providing the query result to a user.

8. The system of claim 7, wherein the operations further comprise:

receiving positive feedback from the user concerning the query result; and responsive to receiving the positive feedback, storing the natural language utterance, the database schema, and the logical form corresponding to the natural language utterance as an additional in-context example within the memory bank.

9. The system of claim 7, wherein:

the natural language text pattern comprises a portion of the natural language utterance, each of the in-context examples comprises an illustrative natural language utterance, an illustrative natural language text pattern corresponding to the illustrative natural language utterance, an illustrative logical form corresponding to the illustrative natural language utterance, and an illustrative database schema, the memory bank is searched for the one or more in-context examples that are relevant to the key using the natural language text pattern as the key, and the searching comprises: determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

10. The system of claim 7, wherein:

each of the in-context examples comprises an illustrative natural language utterance, an illustrative natural language text pattern corresponding to the illustrative natural language utterance, an illustrative logical form corresponding to the illustrative natural language utterance, and an illustrative database schema, and the searching comprises: determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

11. The system of claim 7, wherein the searching comprises: determining a similarity score as a metric of similarity between the key and the illustrative natural language utterance corresponding to each of the in-context examples, comparing the similarity scores to a predetermined threshold, and identifying one or more in-context examples having a similarity score greater than or equal to the predetermined threshold as the one or more in-context examples that are relevant to the key.

12. The system of claim 7, wherein the operations further comprise:

comparing the database schema to the illustrative database schemas of the in-context examples;

determining, based on the comparing, the database schema is not the same as any of the illustrative database schemas; and responsive to determining the database schema is not the same as any of the illustrative database schemas, transmitting the natural language utterance to the pretrained generative artificial intelligence model, wherein:

the natural language text pattern comprises a portion of the natural language utterance, each of the in-context examples comprises an illustrative natural language utterance, an illustrative natural language text pattern corresponding to the illustrative natural language utterance, an illustrative logical form corresponding to the illustrative natural language utterance, and an illustrative database schema, the memory bank is searched for the one or more in-context examples that are relevant to the key using the natural language text pattern as the key, and the searching comprises: determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

13. One or more non-transitory computer-readable media storing instructions which, when executed by one or more processors, cause the one or more processors to perform operations comprising:

acquiring a natural language utterance and a database schema;

transmitting the natural language utterance to a generative artificial intelligence model;

receiving, from the generative artificial intelligence model, a natural language text pattern generated based at least in part on the natural language utterance;

searching, using the natural language text pattern as a key, a memory bank for one or more in-context examples that are relevant to the key, wherein the memory bank comprises in-context examples, and each of the in-context examples comprises an illustrative natural language utterance, an illustrative logical form corresponding to the illustrative natural language utterance, and an illustrative database schema;

generating a prompt comprising the natural language utterance, the database schema, and the one or more in-context examples;

transmitting the prompt to a pretrained generative artificial intelligence model;

receiving, from the pretrained generative artificial intelligence model, a logical form corresponding to the natural language utterance based at least in part on the prompt;

executing the logical form on a database to obtain a query result; and providing the query result to a user.

14. The one or more non-transitory computer-readable media of claim 13, wherein the operations further comprise:

receiving positive feedback from the user concerning the query result; and responsive to receiving the positive feedback, storing the natural language utterance, the database schema, and the logical form corresponding to the natural language utterance as an additional in-context example within the memory bank.

15. The one or more non-transitory computer-readable media of claim 13, wherein:

the natural language text pattern comprises a portion of the natural language utterance, each of the in-context examples comprises an illustrative natural language utterance, an illustrative natural language text pattern corresponding to the illustrative natural language utterance, an illustrative logical form corresponding to the illustrative natural language utterance, and an illustrative database schema, the memory bank is searched for the one or more in-context examples that are relevant to the key using the natural language text pattern as the key, and the searching comprises: determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

16. The one or more non-transitory computer-readable media of claim 13, wherein:

each of the in-context examples comprises an illustrative natural language utterance, an illustrative natural language text pattern corresponding to the illustrative natural language utterance, an illustrative logical form corresponding to the illustrative natural language utterance, and an illustrative database schema, and the searching comprises: determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

17. The one or more non-transitory computer-readable media of claim 13, wherein the searching comprises: determining a similarity score as a metric of similarity between the key and the illustrative natural language utterance corresponding to each of the in-context examples, comparing the similarity scores to a predetermined threshold, and identifying one or more in-context examples having a similarity score greater than or equal to the predetermined threshold as the one or more in-context examples that are relevant to the key.

18. The one or more non-transitory computer-readable media of claim 13, wherein the operations further comprise:

comparing the database schema to the illustrative database schemas of the in-context examples;

determining, based on the comparing, the database schema is not the same as any of the illustrative database schemas; and responsive to determining the database schema is not the same as any of the illustrative database schemas, transmitting the natural language utterance to the pretrained generative artificial intelligence model, wherein:

the natural language text pattern comprises a portion of the natural language utterance, each of the in-context examples comprises an illustrative natural language utterance, an illustrative natural language text pattern corresponding to the illustrative natural language utterance, an illustrative logical form corresponding to the illustrative natural language utterance, and an illustrative database schema, the memory bank is searched for the one or more in-context examples that are relevant to the key using the natural language text pattern as the key, and the searching comprises: determining a similarity score as a metric of similarity between the key and the illustrative natural language text pattern corresponding to each of the in-context examples, comparing the similarity scores to a predetermined threshold, and identifying one or more in-context examples having a similarity score greater than or equal to the predetermined threshold as the one or more in-context examples that are relevant to the key.

* * * * *